(12) United States Patent
Nagae

(10) Patent No.: US 11,065,691 B2
(45) Date of Patent: Jul. 20, 2021

(54) CUTTING TOOL AND METHOD OF MANUFACTURING MACHINED PRODUCT USING THE SAME

(71) Applicant: KYOCERA CORPORATION, Kyoto (JP)

(72) Inventor: Shin Nagae, Yasu (JP)

(73) Assignee: KYOCERA Corporation, Kyoto (JP)

( * ) Notice: Subject to any disclaimer, the term of this patent is extended or adjusted under 35 U.S.C. 154(b) by 108 days.

(21) Appl. No.: 16/326,393

(22) PCT Filed: Aug. 18, 2017

(86) PCT No.: PCT/JP2017/029625
§ 371 (c)(1),
(2) Date: Feb. 19, 2019

(87) PCT Pub. No.: WO2018/034339
PCT Pub. Date: Feb. 22, 2018

(65) Prior Publication Data
US 2019/0184467 A1 Jun. 20, 2019

(30) Foreign Application Priority Data
Aug. 19, 2016 (JP) .............................. JP2016-161014

(51) Int. Cl.
*B23B 27/10* (2006.01)
*B23B 29/12* (2006.01)
*B23B 27/16* (2006.01)

(52) U.S. Cl.
CPC .............. *B23B 27/10* (2013.01); *B23B 27/16* (2013.01); *B23B 29/12* (2013.01); *B23B 2250/12* (2013.01)

(58) Field of Classification Search
CPC .......... B23B 27/10; B23B 27/16; B23B 29/12
See application file for complete search history.

(56) References Cited

U.S. PATENT DOCUMENTS

| 4,848,198 A * | 7/1989 | Royal ..................... B23B 25/02 82/1.11 |
| 7,959,384 B2 * | 6/2011 | Breisch ................... B23B 27/10 407/110 |
| 2007/0283794 A1 | 12/2007 | Giannetti |
| 2008/0124180 A1 | 5/2008 | Breisch |
| 2011/0305531 A1 | 12/2011 | Amstibovitsky et al. |

(Continued)

FOREIGN PATENT DOCUMENTS

| EP | 2789415 A1 * | 10/2014 | .......... B23B 27/007 |
| JP | 2010510897 A | 4/2010 | |

(Continued)

*Primary Examiner* — Alan Snyder
(74) *Attorney, Agent, or Firm* — Viering, Jentschura & Partner mbB

(57) ABSTRACT

A cutting tool may include a holder including a pocket, a cutting insert located at the pocket, a clamp member configured to fix the cutting insert to the pocket, and a flow path including an inflow port and an outflow port. The clamp member may include a screw and a clamp. The flow path may further include a first flow path located in the holder, a second flow path located in the clamp, and a third flow path that is a pipe connecting the first flow path and the second flow path and including a first end part located in the first flow path and a second end part located in the second flow path.

20 Claims, 20 Drawing Sheets

(56) References Cited

U.S. PATENT DOCUMENTS

2014/0294520 A1 10/2014 Henzler et al.
2016/0067786 A1 3/2016 Thelin

FOREIGN PATENT DOCUMENTS

| JP | 2013528123 A | 7/2013 |
| JP | 2014534082 A | 12/2014 |
| WO | 2014166815 A1 | 10/2014 |

* cited by examiner

US 11,065,691 B2

CUTTING TOOL AND METHOD OF MANUFACTURING MACHINED PRODUCT USING THE SAME

CROSS-REFERENCE TO RELATED APPLICATIONS

This application is a national stage entry according to 35 U.S.C. 371 of PCT Application No. PCT/JP2017/029625 filed on Aug. 18, 2017, which claims priority to Japanese Application No. 2016-161014 filed on Aug. 19, 2016, which are entirely incorporated herein by reference.

TECHNICAL FIELD

The present disclosure relates to a cutting tool and a method of manufacturing a machined product using the cutting tool.

BACKGROUND

Various cutting tools with a coolant supply mechanism have been proposed. Cutting tools including a flow path located in a clamp member have also been proposed (refer to, for example, Patent document 1, Patent Document 1: WO 2014/166815).

SUMMARY

In a non-limiting aspect of the present disclosure, a cutting tool may include a holder, a cutting insert, a clamp member, and a flow path. The holder may have a shape extending from a first end to a second end and may include a pocket located at a side of the first end. The cutting insert may be located at the pocket. The clamp member may be configured to fix the cutting insert to the pocket. The flow path may include an inflow port and an outflow port. The holder may further include a screw hole and a first surface located closer to a side of the second end than the screw hole and inclined downward as going farther from the cutting insert. The clamp member may include a screw configured to engage with the screw hole and a clamp. The clamp may include a through hole where the screw is inserted, a front end configured to engage with the cutting insert, and a second surface configured to come into contact with the first surface. The flow path may further include a first flow path located in the holder, a second flow path located in the clamp, and a third flow path that is a pipe connecting the first flow path and the second flow path and including a first end part located in the first flow path and a second end part located in the second flow path.

In a non-limiting aspect of the present disclosure, a method of manufacturing a machined product may include rotating a workpiece, bringing a cutting tool into contact with the workpiece being rotated, and moving the cutting tool away from the workpiece.

DETAILED DESCRIPTION

<Cutting Tool>

Figure 1:
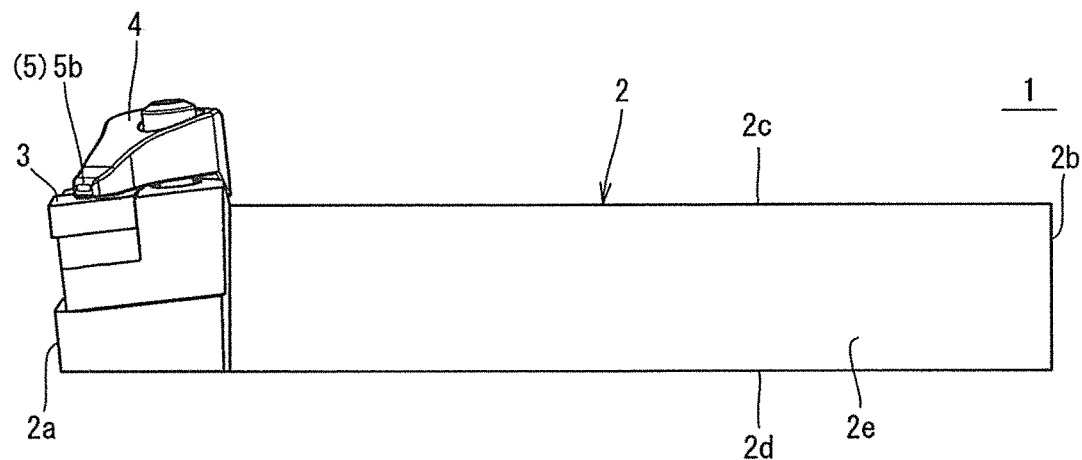
FIG. 1 is a side view illustrating a cutting tool in a first non-limiting embodiment of the present disclosure.

The cutting tool according to various non-limiting aspects of the present disclosure is described in detail below with reference to the drawings. For the sake of description, each of the drawings referred to in the following illustrates, in a simplified form, only main members necessary for describing the various non-limiting aspects of the present disclosure. Hence, the cutting tools of the present disclosure are capable of including any structural member not illustrated in the drawings referred to. Dimensions of the members in each of the drawings are not ones which faithfully represent dimensions of actual structural members and dimension ratios of these members. These points are also true for a method of manufacturing a machined product described later.

(First Non-Limiting Embodiment)

As illustrated in FIGS. 1 to 8, a cutting tool 1 in the first non-limiting embodiment is a tool for use in a turning process. The cutting tool 1 includes a holder 2, a cutting insert 3 (hereinafter also referred to as "an insert 3"), and a clamp member 4, and a flow path 5.

(Holder)

Figure 9:
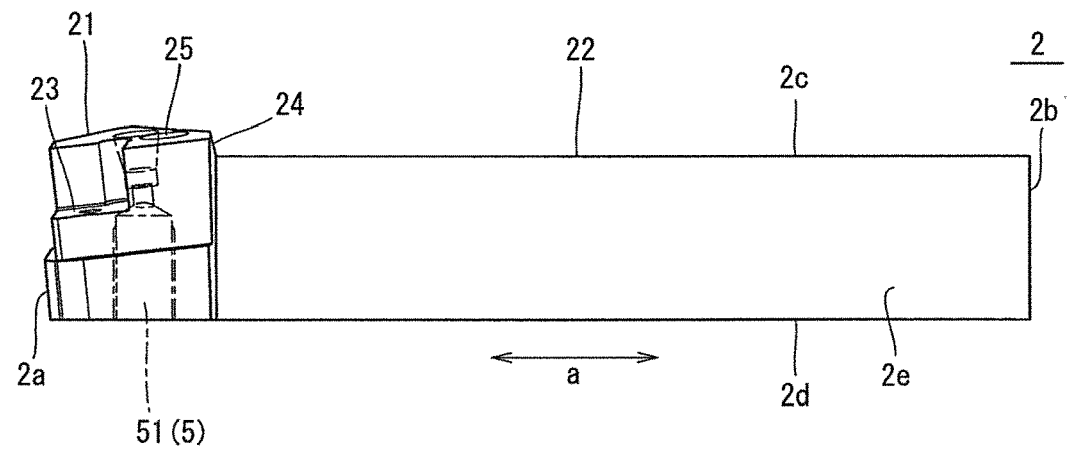
FIG. 9 is a side view illustrating the holder in the cutting tool in FIG. 1.
Figure 10:
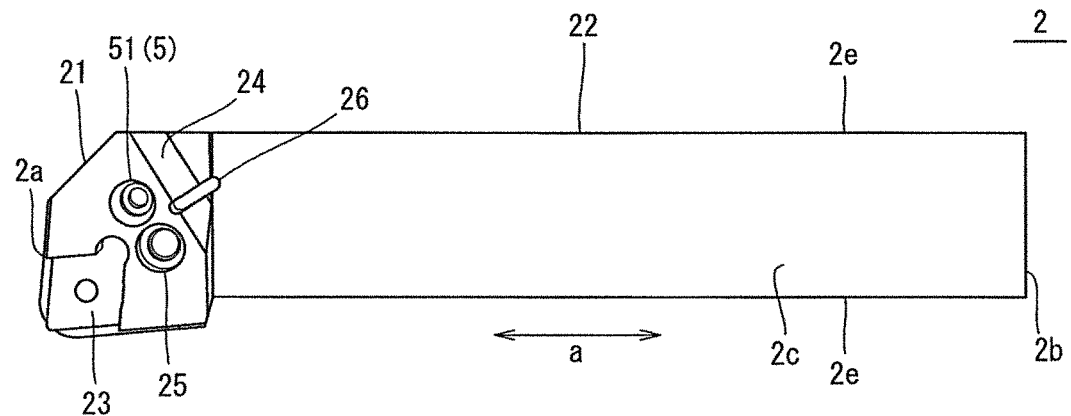
FIG. 10 is a top view illustrating the holder in FIG. 9.

The holder 2 has a shape extending from a first end 2a to a second end 2b as illustrated in FIGS. 9 and 10. In other words, the holder 2 has a columnar shape. The holder 2 in the first non-limiting embodiment has an approximately square column shape and includes an upper surface 2c, a lower surface 2d, and a side surface 2e. The term "the approximately square column shape" is a concept including not only a strict square column shape but also those having slight irregularities or curves. The shape of the holder 2 is not limited to the approximately square column shape. The terms "the upper surface 2c and the lower surface 2d" are used for the sake of convenience and do not indicate an upper direction and a lower direction. For example, the upper surface 2c may not be a surface directed upward when using the cutting tool 1. This is also true for an upper surface 31 and a lower surface 32 of an insert 3, and an upper surface 42a and a lower surface 42b of a clamp 42 described later.

The holder 2 includes a head 21 located at a side of the first end 2a and a shank 22 located at a side of the second end 2b. The head 21 is a part designed to receive the insert 3. The shank 22 is a part designed to be held by a machine tool.

The holder 2 includes a pocket 23 located at a side of the first end 2a. The pocket 23 is located at the head 21. The pocket 23 is the part which corresponds to the location of the insert 3 and is recessed at a side of the first end 2a in the head 21 before attachment of the insert 3.

Figure 2:
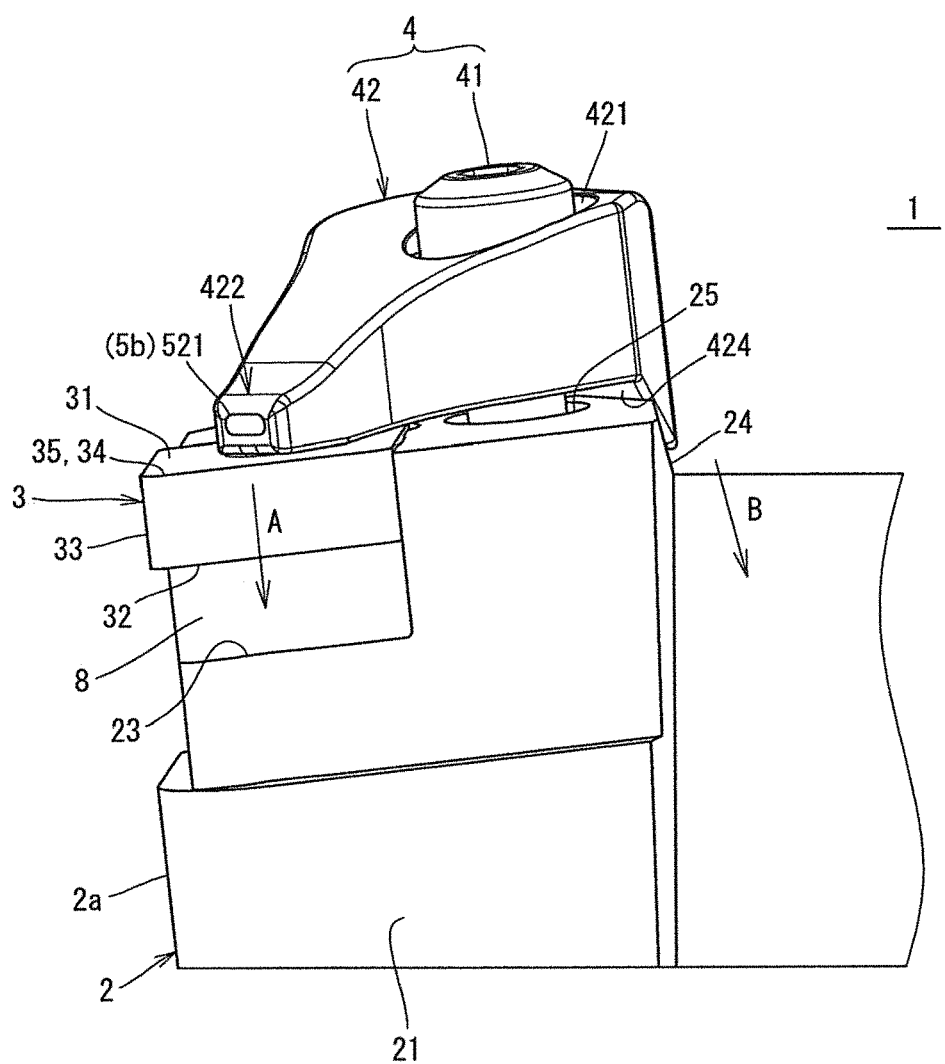
FIG. 2 is an enlarged side view illustrating a side of a first end of a holder in the cutting tool in FIG. 1.
Figure 3:
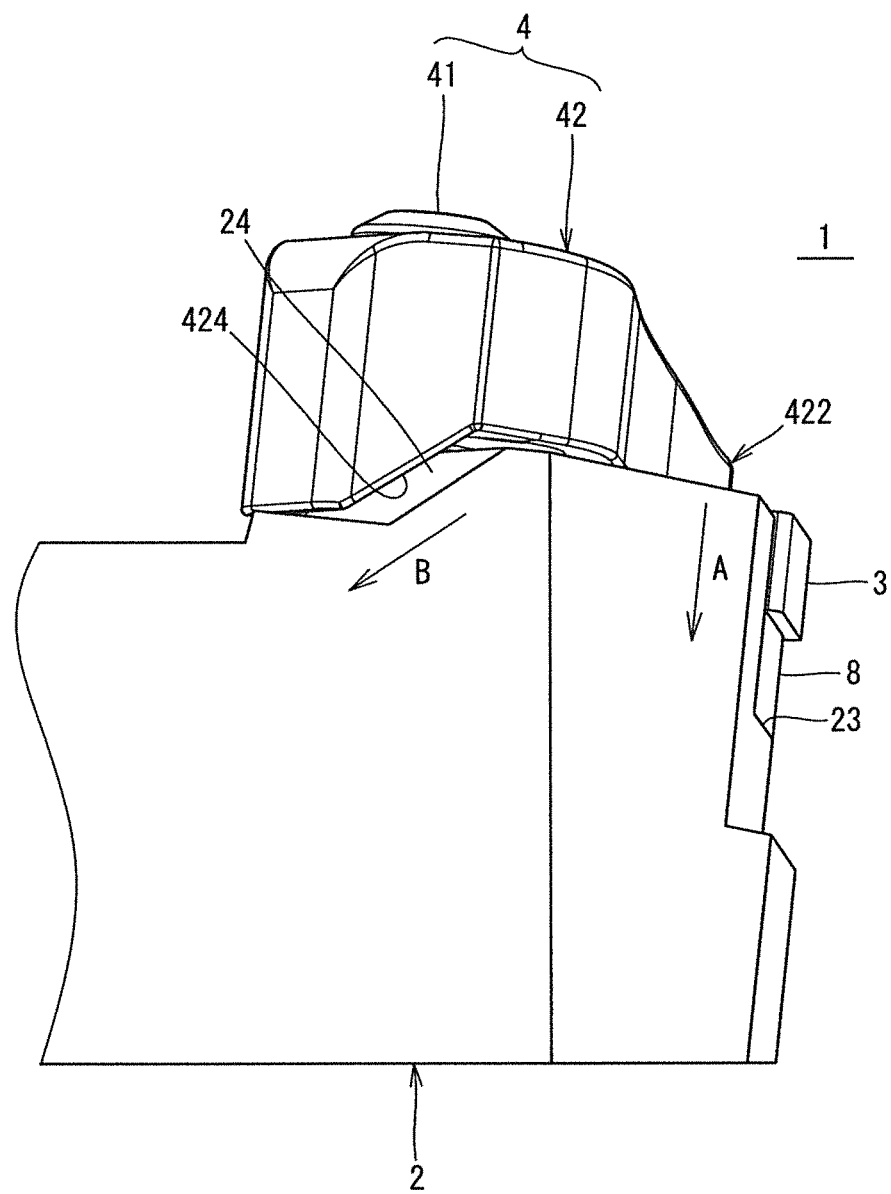
FIG. 3 is an enlarged side view illustrating the side of the first end of the holder in the cutting tool in FIG. 1 when viewed from a direction different from that in FIG. 2.
Figure 4:
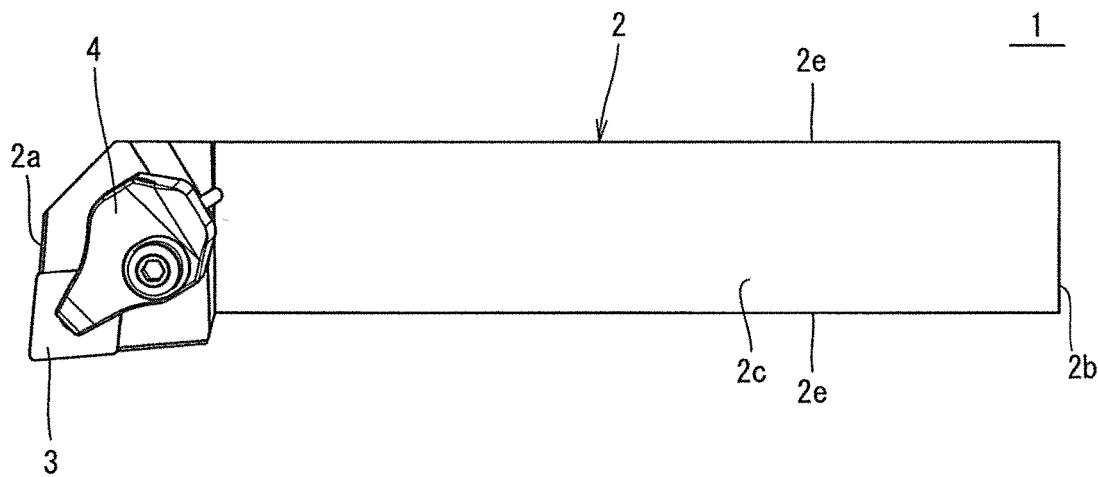
FIG. 4 is a top view illustrating the cutting tool in FIG. 1.
Figure 6:
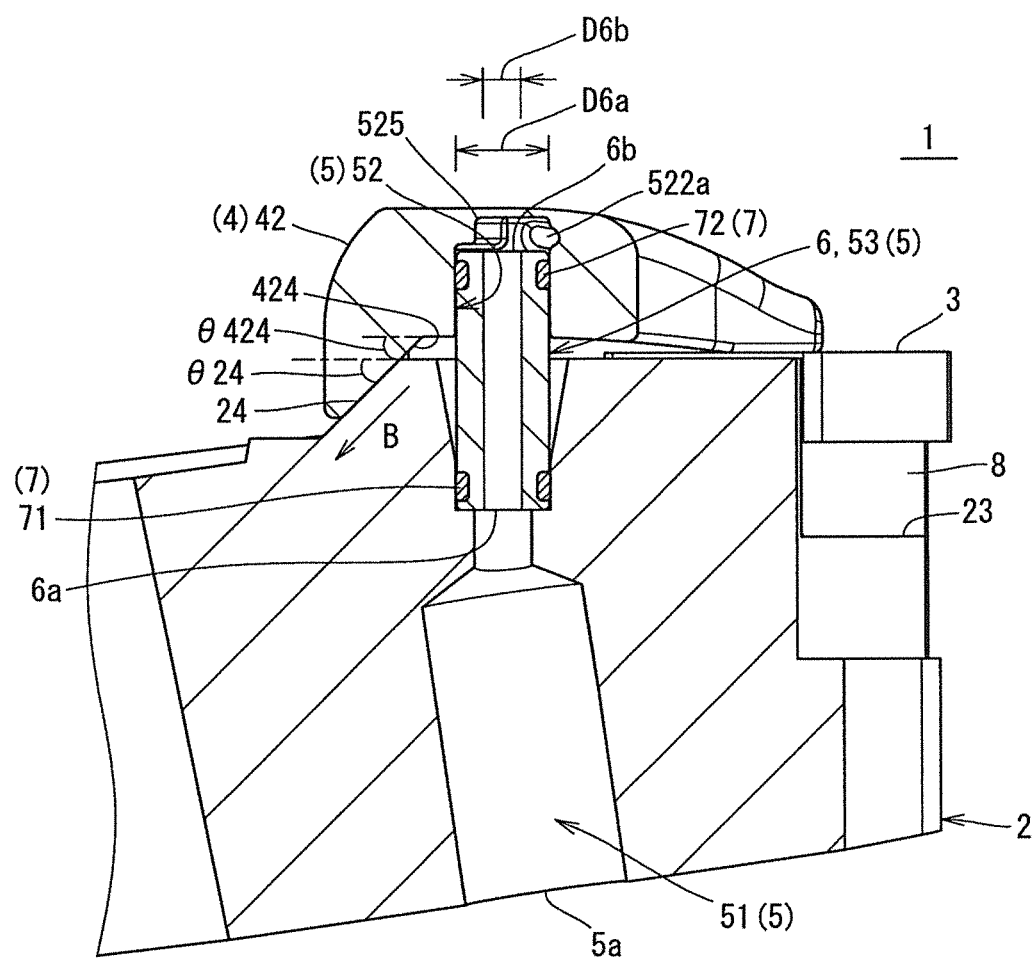
FIG. 6 is a sectional view taken along line I-I in FIG. 5.

The holder 2 includes a first surface 24 and a screw hole 25. As illustrated in FIGS. 2 and 3, the first surface 24 is a surface which is located closer to a side of the second end 2b than the screw hole 25 and inclined downward as going farther from the insert 3, and which comes into contact with a second surface 424 of the clamp 42 described later. The screw hole 25 includes a screw groove and is designed to engage with a screw 41 of the clamp member 4 described later. As illustrated in FIG. 10, both of the first surface 24 and the screw hole 25 are located at the head 21 in the first non-limiting embodiment. The first surface 24 is located so as to face the pocket 23 with the screw hole 25 interposed therebetween. A part of the first surface 24 is located closer to a side of the second end 2b than the screw hole 25, and the first surface 24 also includes a part located closer to the first end 2a than the screw hole 25 in the first non-limiting embodiment. The shape of the first surface 24 is not limited to the above, and the first surface 24 may include at least a part located behind the screw hole 25 in an arrowed direction B described later in a non-limiting aspect of the present disclosure. An inclination angle θ24 of the first surface 24 is, for example, 30-60 degrees as illustrated in FIG. 6.

An up-down direction in the holder 2 is, for example, a direction along the screw hole 25. Specifically, in cases where an advance direction of the screw 41 is taken as negative and a reverse direction is taken as positive when the screw 41 is engaged with the screw hole 25, a negative side in the direction along the screw hole 25 is a lower direction, and a positive side in the direction along the screw hole 25 is an upper direction. An up-down direction in a first flow path 51 located in the holder 2 described later can be defined in the same manner as the up-down direction in the holder 2.

The holder 2 includes a groove 26 as illustrated in FIG. 10. A part of the groove 26 is located at the first surface 24. The groove 26 is a portion that a pin 425 of the clamp 42 may be inserted described later. The groove 26 extends along the arrowed direction B described later and functions to guide the pin 425 of the clamp 42. From the viewpoint of strength of the holder 2, the groove 26 is located between the screw hole 25 and the first flow path 51 in a direction vertical to the arrowed direction B in the first non-limiting embodiment.

For example, steel, cast iron, or aluminum alloy is usable as a material of the holder 2. Dimensions of the holder 2 are, for example, settable to the following values. A dimension (length) of the holder 2 in a direction parallel to a longitudinal direction "a" of the holder 2 is, for example, 32-500 mm. A dimension (width) of the holder 2 in a direction vertical to the longitudinal direction "a" is, for example, 10-50 mm.

(Cutting Insert)

The insert 3 is a member located at the pocket 23 as illustrated in FIG. 2. The insert 3 is located at the pocket 23 with a sheet member 8 interposed therebetween in the first non-limiting embodiment. In other words, the cutting tool 1 further includes the sheet member 8 located between the insert 3 and the pocket 23. With this configuration, a fracture of the insert 3 is less likely to cause damage to the holder 2. For example, cemented carbide is usable as a material of the sheet member 8. The composition of the cemented carbide is described below when the material of the insert 3 is described in detail later. Alternatively, the insert 3 may directly be located at the pocket 23 without interposing the sheet member 8 therebetween.

The insert 3 is a plate-shaped member and includes the upper surface 31, the lower surface 32, a side surface 33, and a cutting edge 34 in the first non-limiting embodiment.

The upper surface 31 and the lower surface 32 have a quadrangular shaped surface. The quadrangular shape may be approximately a quadrangular shape and may not be a strict quadrangular shape. The upper surface 31 and the lower surface 32 may have other shapes instead of the quadrangular shape. Examples of other shapes include triangular shapes, pentagonal shapes, hexagonal shapes and octagonal shapes. At least a part of the upper surface 31 functions as a rake surface through which chips flow during a cutting process.

The side surface 33 is a surface which is located between the upper surface 31 and the lower surface 32 and connects to each of the upper surface 31 and the lower surface 32. The side surface 33 is constituted by four surface regions correspondingly to four side parts of each of the upper surface 31 and the lower surface 32. At least a part of the side surface 33 functions as a flank surface during the cutting process.

The cutting edge 34 is located in at least a part of a ridge part 35 where the upper surface 31 intersects with the side surface 33. The cutting edge 34 is located throughout the ridge part 35 in the first non-limiting embodiment. The insert 3 is located at the pocket 23 in a state in which the cutting edge 34 is protruded at a side of the first end 2a of the holder 2.

Figure 5:
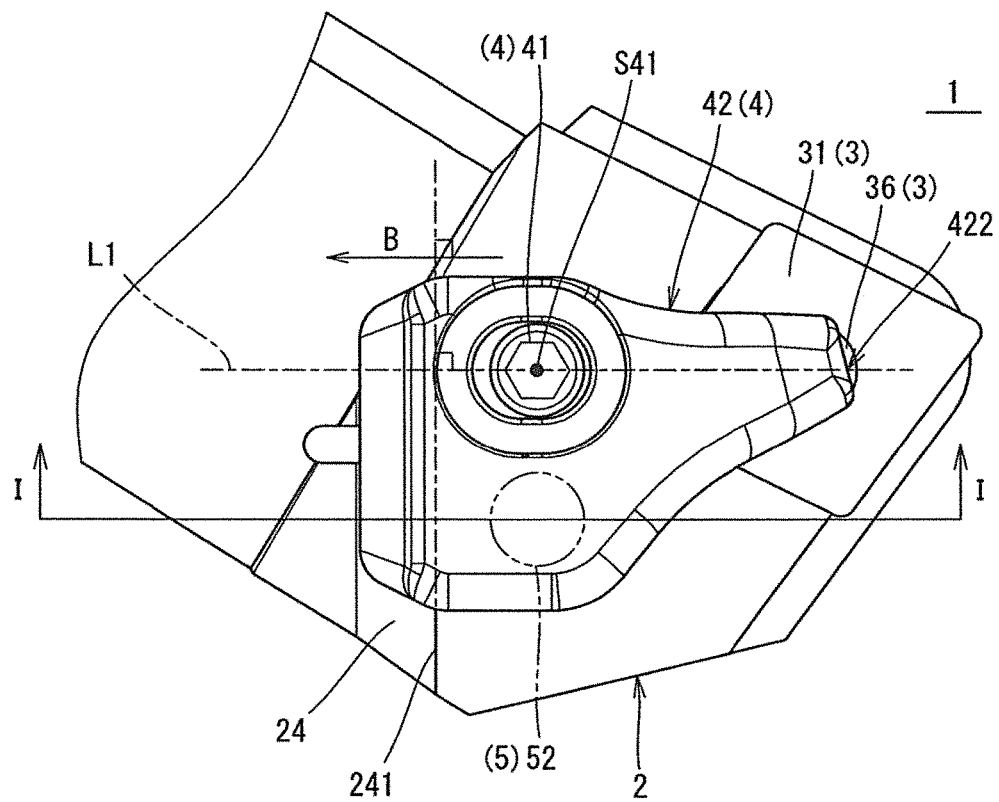
FIG. 5 is an enlarged top view illustrating the side of the first end in the cutting tool in FIG. 4.

The insert 3 includes a hole 36 as illustrated in FIG. 5. The hole 36 is a portion located at the upper surface 31 and designed to engage with a front end 422 of the clamp 42 described later. The hole 36 may or may not extend between the upper surface 31 and the lower surface 32.

For example, cemented carbide or cermet is usable as a material of the insert 3. Examples of the cemented carbide include WC—Co, WC—TiC—Co and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co. The cermet is a sintered composite material obtainable by compositing metal into a ceramic ingredient. Examples of the cermet include ones which are composed mainly of a titanium compound, such as titanium carbide (TiC) or titanium nitride (TiN).

A surface of the insert 3 may be coated with a coating film. Examples of composition of the coating film include titanium carbide (TiC), titanium nitride (TiN), titanium carbonitride (TiCN) and alumina ($Al_2O_3$). For example, a chemical vapor deposition (CVD) method or a physical vapor deposition (PVD) method is usable as a method of depositing a coating film.

Dimensions of the insert 3 are, for example, settable to the following values. A length of one side of the quadrangular shape in the upper surface 31 and the lower surface 32 is, for example, 3-54 mm. A thickness of the insert 3 between the upper surface 31 and the lower surface 32 is, for example, 2-10 mm. The insert 3 may be either a positive type or a negative type.

(Clamp Member)

The clamp member 4 is a member for fixing the insert 3 to the pocket 23 as illustrated in FIGS. 2 and 3. The clamp member 4 includes the screw 41 and the clamp 42. The screw 41 is a member designed to engage with the screw hole 25 of the holder 2. The clamp 42 is a member designed to engage with the insert 3 through insertion of the screw 41 into the clamp 42.

Figure 11:
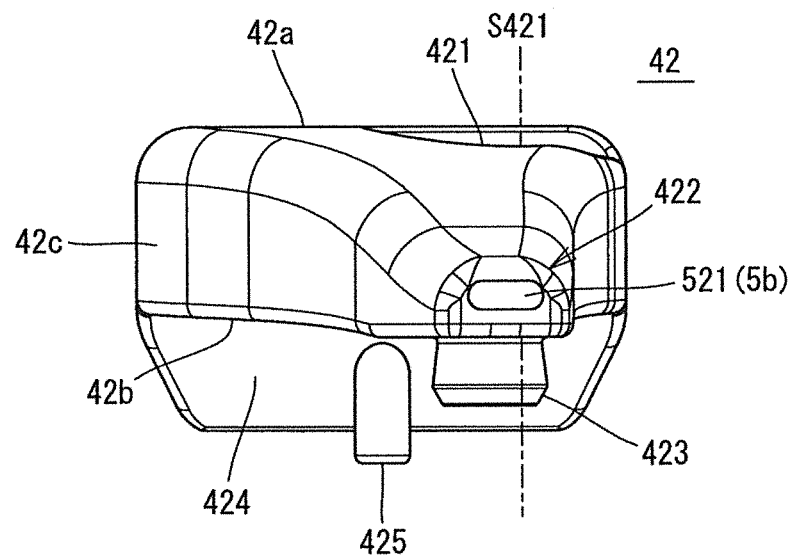
FIG. 11 is an enlarged diagram illustrating a state in which a clamp in the cutting tool in FIG. 1 is viewed from a side of a front end.
Figure 12:
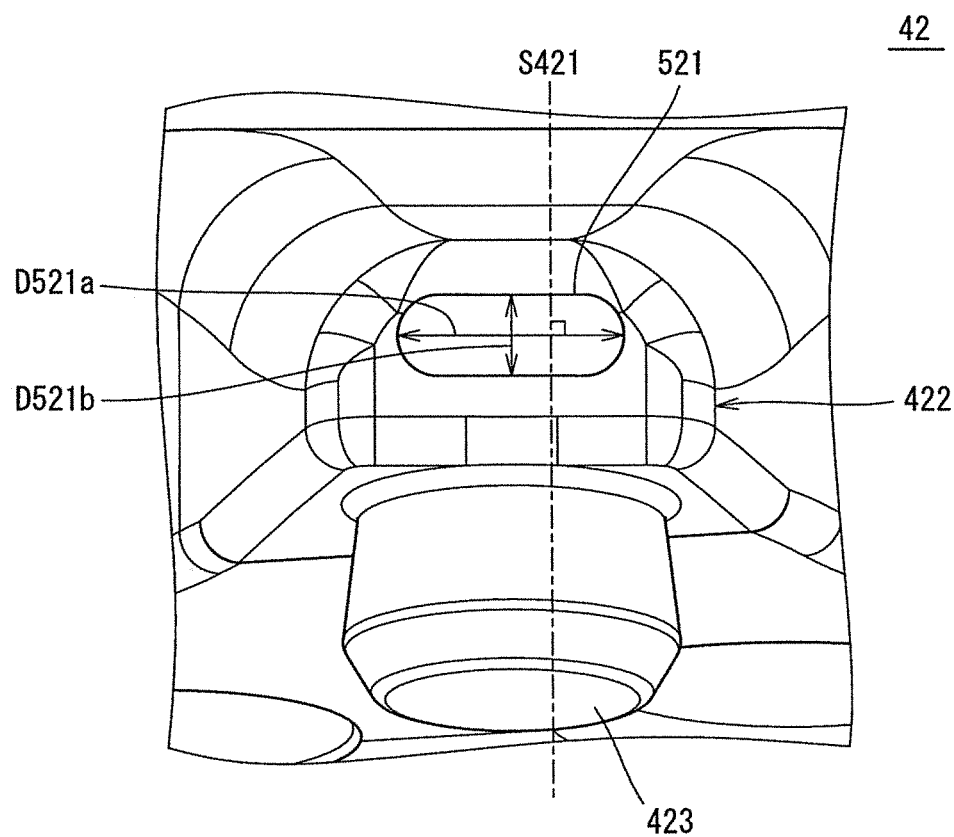
FIG. 12 is an enlarged diagram illustrating circumferences of a first opening in the clamp in FIG. 11.
Figure 13:
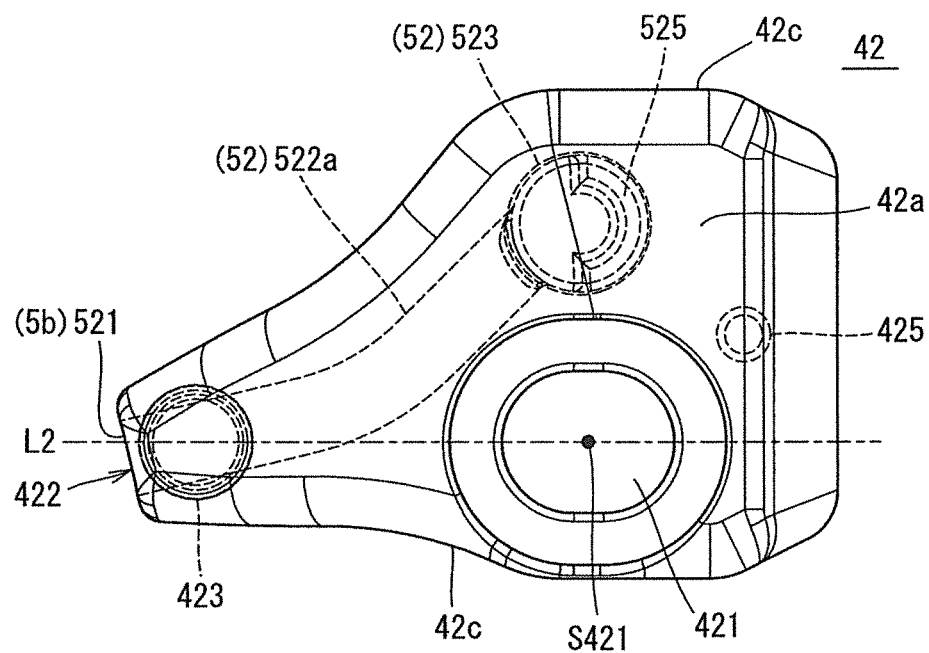
FIG. 13 is a top view illustrating the clamp in FIG. 11.
Figure 14:
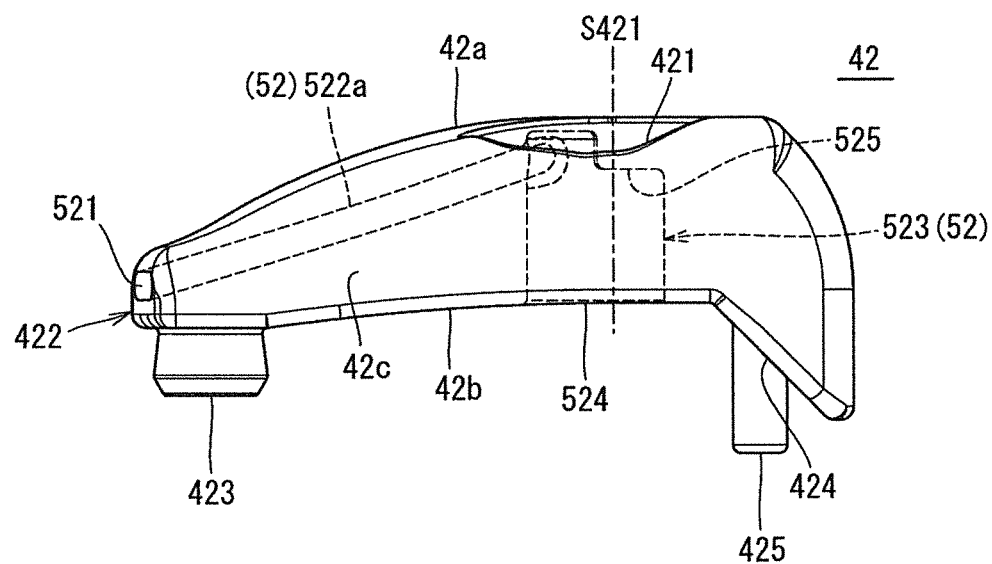
FIG. 14 is a side view illustrating the clamp in FIG. 11.
Figure 15:
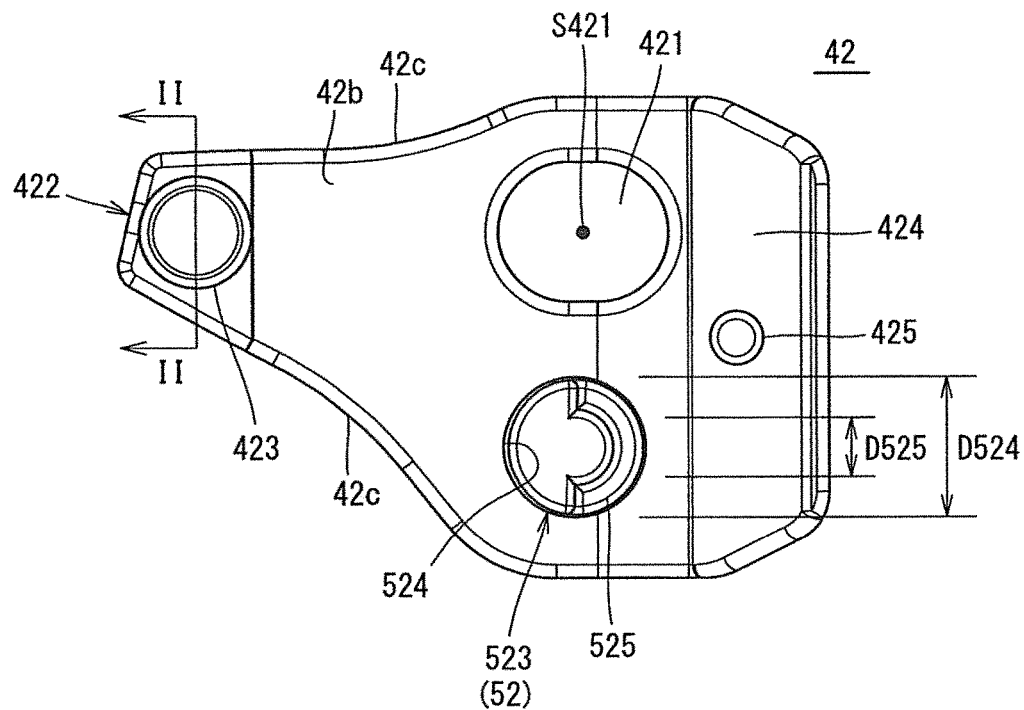
FIG. 15 is a bottom view illustrating the clamp in FIG. 11.

The clamp 42 includes a through hole 421, the front end 422 and the second surface 424 as illustrated in FIGS. 11 to 15. The through hole 421 is a portion that the screw 41 may be inserted as illustrated in FIG. 2. The front end 422 is a portion designed to engage with the insert 3. The second surface 424 is a surface brought into contact with the first surface 24. With these configurations, the cutting tool 1 can be configured to include a so-called double clamp mechanism. Specifically, as illustrated in FIGS. 2 and 3, the second surface 424 of the clamp 42 is brought into contact with the first surface 24 of the holder 2 by causing the front end 422 of the clamp 42 to be engaged with the insert 3. Subsequently, the screw 41 is inserted into the through hole 421 of the clamp 42, and a tip of the screw 41 is then screwed into the screw hole 25 of the holder 2, so that the insert 3 can be pressed in an arrowed direction A by the front end 422 of the clamp 42. By causing the second surface 424 of the clamp 42 to be further pressed against the holder 2 while keeping in contact with the first surface 24 of the holder 2, the insert 3 can be pulled in the arrowed direction B. Consequently, the insert 3 can be fixed to the pocket 23 in a double clamp state in the arrowed direction A and the arrowed direction B. As illustrated in FIGS. 5, 13 and 15, the through hole 421 has an elliptical shape having a long axis along the arrowed direction B.

The second surface 424 may be substantially contacted with the first surface 24. That is, the second surface 424 may not be entirely contacted with the first surface 24 in so far as the insert 3 can be pulled in the arrowed direction B by the clamp 42.

The clamp 42 includes an upper surface 42a, a lower surface 42b, and a side surface 42c in the first non-limiting embodiment as illustrated in FIG. 11. The through hole 421 extends between the upper surface 42a and the lower surface 42b. The second surface 424 is located at the lower surface 42b.

The front end 422 includes a columnar engaging part 423 protruding downward in the first non-limiting embodiment as illustrated in FIGS. 11 and 14. The engaging part 423 is protruded downward from the lower surface 42b. The engaging part 423 is configured to be insertable into the hole 36 located at the upper surface 31 of the insert 3 described above. The front end 422 can be engaged with the insert 3 by inserting the engaging part 423 into the hole 36 located at the upper surface 31 of the insert 3 in the first non-limiting embodiment.

The engaging part 423 has an approximately circular column shape in the first non-limiting embodiment. The term "approximately circular column shape is a concept including not only a strict circular column shape but also those having slight irregularities or curves. The shape of the engaging part 423 is not limited to the approximately circular column shape.

An up-down direction in the clamp 42 is, for example, a direction along the through hole 421. Specifically, in cases where the advance direction of the screw 41 is taken as negative and a reverse direction is taken as positive when the screw 41 is inserted into the through hole 421, a negative side in the direction along the through hole 421 is a lower direction, and a positive side in the direction along the through hole 421 is an upper direction. An up-down direction in a second flow path 52 located in the clamp 42 described later can be defined in the same manner as the up-down direction in the clamp 42.

The second surface 424 is a surface inclined downward as going farther from the front end 422 in the first non-limiting embodiment as illustrated in FIG. 14. An inclination angle θ424 of the second surface 424 is, for example, 30-60 degrees as illustrated in FIG. 6. The inclination angle θ424 of the second surface 424 is equal to the inclination angle θ24 of the holder 2 in the first surface 24. The phrase that "θ424 is equal to θ24" denotes that both may be substantially equal to each other. For example, there may be ±10 degree difference therebetween.

As illustrated in FIG. 5, a straight line L1 connecting a center S41 of the screw 41 and the front end 422 of the clamp 42 may be orthogonal to an upper edge 241 of the first surface 24 of the holder 2 when the screw 41 is viewed from immediately above. In the first non-limiting embodiment, the center S41 of the screw 41 and the front end 422 of the clamp 42 are located side by side along the arrowed direction B in which the insert 3 is pulled by the clamp 42. In other words, the arrowed direction B in which the insert 3 is pulled by the clamp 42 may be therefore orthogonal to the upper edge 241 of the first surface 24. When satisfying this configuration, it becomes possible to improve constraining force of the clamp member 4. The straight line L1 may be substantially orthogonal to the upper edge 241. The term "being orthogonal" in the first non-limiting embodiment includes a range of 90±5 degrees.

The clamp 42 includes a pin 425 extending downward from the second surface 424 in the first non-limiting embodiment as illustrated in FIGS. 11 and 14. The pin 425 is designed to be insertable into the groove 26 of the holder 2 illustrated in FIG. 10. With this configuration, movement of the clamp 42 along with tightening of the screw 41 can be reduced by inserting the pin 425 into the groove 26 of the holder 2 when the insert 3 is fixed to the pocket 23 by the clamp member 4. The pin 425 has an approximately circular column shape in the first non-limiting embodiment. The pin 425 of the approximately circular column shape leads to a smooth operation to attach the insert 3.

Examples of material of the screw 41 include SCM440. Examples of material of the clamp 42 include SCM440.

(Flow Path)

The flow path 5 functions as a portion that a coolant may flow. Examples of the coolant include water-insoluble cutting fluids and water-soluble cutting fluids. Examples of the water-insoluble cutting fluids include oil-based cutting fluids, inert extreme pressure-based cutting fluids and active extreme pressure-based cutting fluids. Examples of the water-soluble cutting fluids include emulsion-type, soluble-type and solution-type cutting fluids.

Figure 8:
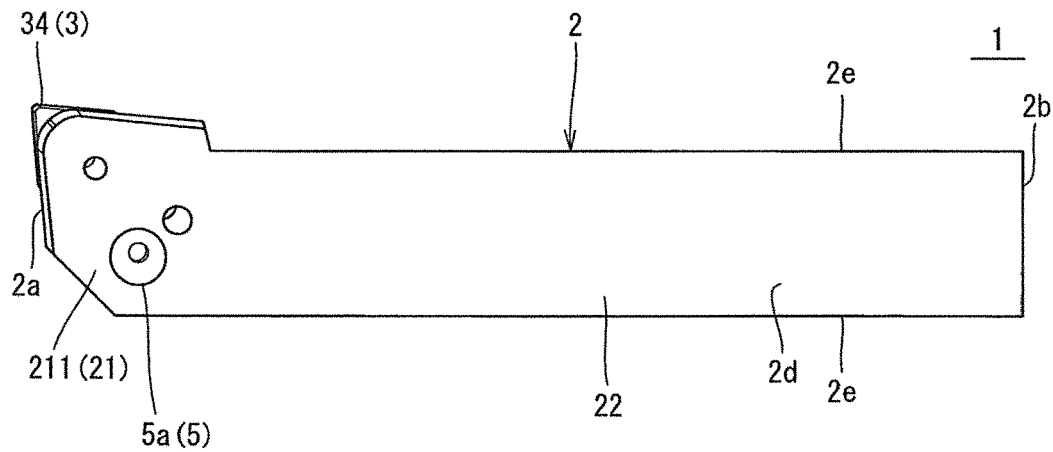
FIG. 8 is a bottom view illustrating the cutting tool in FIG. 1.

The flow path 5 is the portion including an inflow port 5a and an outflow port 5b. The inflow port 5a is a portion that the coolant supplied from the outside may introduce into the flow path 5. The inflow port 5a opens into the lower surface 2d of the holder 2 in the first non-limiting embodiment as illustrated in FIG. 8. More specifically, the inflow port 5a opens into the lower surface 211 of the head 21. The outflow port 5b is a portion that coolant may flow toward the insert 3. The outflow port 5b opens into the front end of the claim 42 in the first non-limiting embodiment as illustrated in FIG. 2.

As illustrated in FIG. 6, the flow path 5 includes a first flow path 51, a second flow path 52, and a third flow path 53. The first flow path 51 is located in the holder 2. The second flow path 52 is located in the clamp 42. The third flow path 53 is a pipe 6 which connects the first flow path 51 and the second flow path 52 and includes a first end part 6a located in the first flow path 51 and a second end part 6b located in the second flow path 52. With these configurations, the flow path 5 is composed of an interior of the holder 2, the pipe 6, and an interior of the clamp 42 in the cutting tool 1 including the double clamp mechanism. Because the pipe 6 constituting the third flow path 53 is a separate member from the holder 2 and the clamp 42, the pipe 6 is slightly movable in a state in which the pipe 6 connects the first flow path 51 and the second flow path 52. The pipe 6 is therefore capable of following the movement of the clamp 42 when the insert 3 is pulled in the arrowed direction B by the clamp 42. This leads to strong restraining force of the clamp member 4, thereby ensuring that the insert 3 is strongly fixable to the pocket 23. The cutting tool 1 is consequently capable of having the strong constraining force while including the coolant supply mechanism.

The pipe 6 has an approximately cylindrical shape in a non-limiting aspect of the present disclosure. The term "the approximately cylindrical shape" is a concept including not only a strict cylindrical shape but also those having slight irregularities or curves. The shape of the pipe 6 is not limited to the approximately cylindrical shape.

Examples of material of the pipe 6 include stainless steel, steel and resins. A length of the pipe 6 in a direction parallel to a longitudinal direction of the pipe 6 may be, for example, 10-20 mm. An outer diameter D6a of the pipe 6 may be, for example, 3-7 mm. An inner diameter D6b of the pipe may be, for example, 1-4 mm.

The cutting tool 1 may include annular sealing members 7 respectively fitted to outer peripheral portions of the first end part 6a and the second end part 6b of the pipe 6. Specifically, the cutting tool 1 may further include the first annular sealing member 71 fitted to the outer peripheral portion of the first end part 6a of the pipe 6, and the second annular sealing member 72 fitted to the outer peripheral portion of the second end part 6b. When satisfying this configuration, the coolant is less likely to leak. Examples of the sealing members 7 (the first sealing member 71 and the second sealing member 72) include O-rings. The first sealing member 71 and the second sealing member 72 may or may not have the same configuration.

Figure 7:
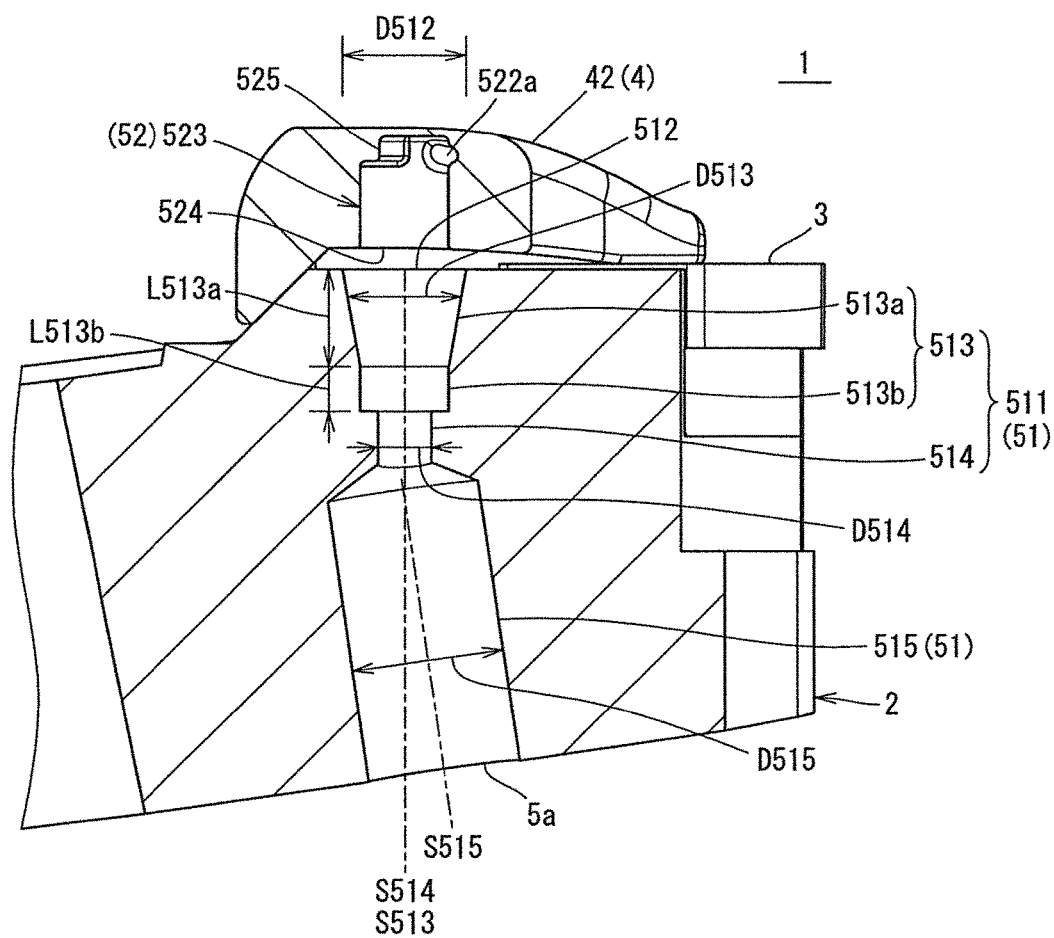
FIG. 7 is a diagram of FIG. 6 without the pipe.

The first flow path 51 may include a first coupling part 511 as illustrated in FIG. 7. The first coupling part 511 may include a first coupling port 512 that the first end part 6a of the pipe 6 may be inserted. The first coupling part 511 may include a first region 513 extending from the first coupling port 512 toward the inward of the holder 2. The first region 513 may include a first portion 513a whose inner diameter D513 becomes smaller as going farther from the first coupling port 512. When satisfying these configurations, the first portion 513a has a tapered shape, thus ensuring that the first end part 6a of the pipe 6 can smoothly enter the first flow path 51. Additionally, the inner diameter D513 at a side of the first coupling port 512 in the first region 513 becomes greater, thus making it easier for the pipe 6 to move in a state in which the second end part 6b of the pipe 6 is located in the second flow path 52. This further makes it easier for the pipe 6 to follow the movement of the clamp 42 when the insert 3 is pulled in the arrowed direction B by the clamp 42. The inner diameter D513 may be, for example, 5-10 mm. Alternatively, the first portion 513a may have a multi-step tapered shape.

The first region 513 may include a portion 513b located continuously with the first portion 513a and having a constant inner diameter D513 in the first non-limiting embodiment. When satisfying this configuration, a part of the pipe 6 which is located at a side of the first end part 6a is less likely to move, thereby stabilizing a coupling state of the pipe 6 and the first flow path 51. A length L513a of the first portion 513a in a longitudinal direction of the first region 513 may be greater than a length L513b of the portion 513b. The length L513a may be, for example, 3-8 mm. The length L513b may be, for example, 1-5 mm.

The first coupling part 511 may include a second region 514 having a cylindrical shape and located farther from the first coupling port 512 than the first region 513. An inner diameter D514 of the second region 514 may be smaller than an inner diameter D512 of the first coupling port 512. Furthermore, the inner diameter D514 of the second region 514 may be smaller than the outer diameter D6a of the pipe 6 in the first non-limiting embodiment. When satisfying these configurations, the pipe 6 is less likely to move more inward of the holder 2 than the second region 514, and the pipe 6 is therefore less likely to come out of the holder 2. The inner diameter D514 may be, for example, 1-5 mm. The inner diameter D512 may be, for example, 3-7 mm.

The second region 514 has an approximately cylindrical shape and the second region 514 is located continuously with the first region 513 in the first non-limiting embodiment. The second region 514 is located coaxially with the first region 513. In other words, a central axis S514 of the second region 514 coincides with a central axis S513 of the first region 513. When satisfying this configuration, the third flow path 53 and the first flow path 51 are located coaxially at a side of the first end part 6a of the pipe 6 located in the first region 513. This makes it possible to reduce pressure loss of the coolant, thereby achieving a good coolant function. The central axis S513 of the first region 513 is obtainable by successively arranging a center of the inner diameter D514 of the second region 514. Similarly, the central axis S514 of the second region 514 is obtainable by successively arranging the center of the inner diameter D514 of the second region 514. Alternatively, the second region 514 may not be located coaxially with the first region 513 in so far as the pipe 6 is less likely to come out of the holder 2.

The first flow path 51 may include a first portion 515 having a cylindrical shape and located continuously with the first coupling part 511. The central axis S514 of the second region 514 of the first coupling part 511 may not coincide with a central axis S515 of the first part 515. In other words, the central axis S514 of the second region 514 may not be located coaxially with the central axis S515 of the first part 515. When satisfying this configuration, it is possible to reduce pressure loss of the coolant in a connecting portion of the first flow path 51 and the third flow path 53, and it is also possible to enhance degree of freedom in designing a supply mechanism for supplying the coolant from the inflow port 5a. The central axis S515 of the first part 515 is obtainable by successively arranging a center of the inner diameter D515 of the first part 515. The inner diameter D515 may be, for example 5-10 mm. The first part 515 has an approximately cylindrical shape and is located continuously with the inflow port 5a in the first non-limiting embodiment.

The first flow path 51 is formable, for example, by a drilling process using a drill or the like. A part of a hole formed by the drilling process which does not function as the first flow path 51 may be closed with a sealing member in order to prevent leak of the coolant in a non-limiting aspect of the present disclosure. Examples of the sealing member include solder, resin and a screw member. The above-mentioned points are also true for the second flow path 52.

The second flow path 52 may include, as the outflow port 5b, a first opening 521 that opens into the front end 422 of the clamp 42 as illustrated in FIGS. 11 and 12. An inner diameter D521a of the first opening 521 in a direction orthogonal to the central axis S421 of the through hole 421 may be greater than an inner diameter D521b in a direction parallel to the central axis S421. When satisfying these configurations, the following effects are obtainable. Firstly, because the inner diameter D521a is greater than inner diameter D521b, the coolant can flow out of the first opening 521 in a state in which the coolant is spread laterally (in a direction orthogonal to the central axis S421) while ensuring a flow rate. It is therefore possible to suitably spray the coolant to a wide region of the insert 3 to be cooled. Further, because the first opening 521 opens into the front end 422 of the clamp 42 designed to engage with the insert 3, it is possible to decrease a distance over which the coolant flowing out of the first opening 521 is sprayed to the insert 3. Consequently, the coolant is less likely to spread to a region that may not require cooling. The above-mentioned effects cooperate with each other to efficiently spray the coolant to the insert 3.

The central axis S421 of the through hole 421 is obtainable by successively arranging a center of an inner diameter of the through hole 421. The inner diameter D521a may be, for example, 1-5 mm. The inner diameter D521b may be, for example, 0.5-2.5 mm.

When the clamp 42 is seen through along the central axis S421 of the through hole 421 as illustrated in FIG. 13, the second flow path 52 may include a portion 522a (fifth portion) inclined so as to go farther from a straight line L2 connecting the central axis S421 of the through hole 421 and the front end 422 as going farther from the front end 422. When satisfying this configuration, an outflow direction of the coolant can be kept well while maintaining arrangement of the clamp 42 and the screw 41 which exerts strong constraining force. The suitable coolant function and clamp function are attainable. The strength of the clamp is maintainable. An inner diameter of the portion 522a may be, for example, 1-2.8 mm. The portion 522a curvedly extends from the first opening 521 toward the second coupling part. The curving of the portion 522a makes it possible to reduce the pressure loss of the coolant.

When the clamp 42 is seen through a direction vertical to the central axis S421 of the through hole 421 as illustrated in FIG. 14, the portion 522a may be inclined upward as going farther from the front end 422. In other words, when the clamp 42 is seen through from a direction vertical to the central axis S421 of the through hole 421, the second flow path 52 may include a portion 522a (sixed portion) inclined upward as going farther from the front end 422. When satisfying this configuration, the coolant flowing out of the first opening 521 can be suitably sprayed to the cutting edge 34 of the insert 3.

The portion 522a of the second flow path 52 is inclined so as to go farther from the straight line L2 as going farther from the front end 422 and inclined upward as going farther from the front end 422 in the first non-limiting embodiment. That is, the fifth portion and the sixth portion in the second flow path 52 are the same portion (portion 522a). The shape of the second flow path 52 is not limited thereto. The second flow path 52 may include separately the fifth portion inclined so as to go farther from the straight line L2 as going farther from the front end 422, and the sixth portion inclined upward as going farther from the front end 422. That is, the fifth portion may be inclined in an up-down direction, and the sixth portion may not be inclined relative to the straight line L2, namely, may be parallel to the straight line L2. When the sixth portion is located closer to a side of the front end 422 than the fifth portion, the effect of spraying the coolant to the cutting edge 34 is suitably attainable.

Figure 16:
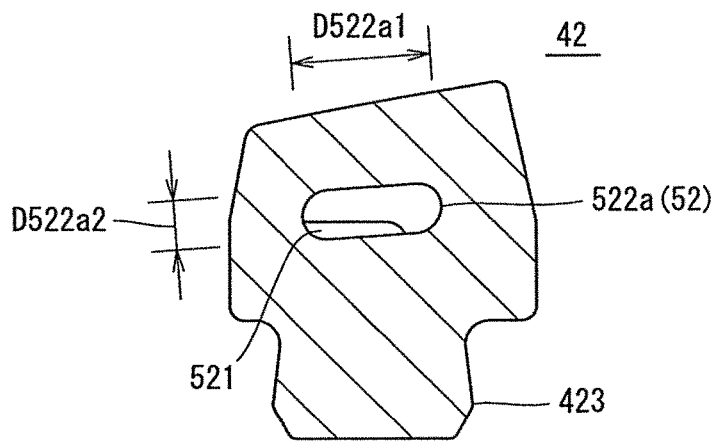
FIG. 16 is an enlarged sectional view taken along line II-II in FIG. 15.

As illustrated in FIG. 16, a cross sectional shape of the portion 522a may have an approximately elliptical shape in which an inner diameter D522a1 in a direction orthogonal to the central axis S421 of the through hole 421 is greater than an inner diameter D522a2 in the direction parallel to the central axis S421. The inner diameter D522a1 is an inner diameter of the portion 522a in a direction substantially orthogonal to the central axis S421. The inner diameter D522a2 is an inner dimeter of the portion 522a in the direction substantially parallel to the central axis S421. The term "being parallel" includes a range of ±10 degrees in the first non-limiting embodiment. The term "substantially elliptical shape" is a concept including not only a strict elliptical shape but also those having slight irregularities or curves.

The second flow path 52 may include a second coupling part 523 as illustrated in FIG. 7. The second coupling part 523 may include a second coupling port 524 that the second end part 6b of the pipe 6 may be inserted. The second coupling part 523 may include a step part 525 located more inward of the clamp 42 than the second coupling part 524. An inner diameter D525 of the step part 525 may be smaller than an inner diameter D524 of the second coupling port 524 as illustrated in FIG. 15. The inner diameter D525 of the step part 525 may be smaller than the outer diameter D6a of the pipe 6 in the first non-limiting embodiment. When satisfying these configurations, the pipe 6 is less likely to move inward of the clamp 42 than the step part 525 and the pipe 6 is therefore less likely to come out of the clamp 42 as illustrated in FIG. 6. The inner diameter D525 may be, for example, 1-5 mm. The inner diameter D524 may be, for example, 3-7 mm.

The second coupling part 523 may have a cylindrical shape as illustrated in FIG. 14. The step part 525 may be located along a semiperiphery of the second coupling part 523 as illustrated in FIG. 15. The second coupling part 523 has an approximately cylindrical shape in the first non-limiting embodiment. The step part 525 is therefore located along a semiperiphery of an outer peripheral surface of the second coupling part 523. More specifically, the step part 525 is located along a semiperiphery located at a side of the second end 2b on an outer peripheral surface of the second coupling part 525 as illustrated in FIG. 15. When satisfying this configuration, machining of the step part 525 can be facilitated and coupling of the second flow path 52 and the third flow path 53 becomes smoother. An inner diameter of the second coupling part 523 may be, for example, 3-7 mm. The second coupling part 523 is located continuously with the portion 522a of the second flow path 52. That is, the step part 525 is located away from the portion 522a. Therefore, the coolant smoothly flows from the second coupling part 523 to the portion 522a. The step part 525 is not limited to the configuration located along the semiperiphery of the second coupling part 523 in so far as the step part 525 accomplishes its function.

(Second Non-Limiting Embodiment)

A cutting tool in the second non-limiting embodiment of the present disclosure is described in detail with reference to FIGS. 17 to 30. The following description is focused on parts different from those in the first non-limiting embodiment. Descriptions of parts having the same configuration as the first non-limiting embodiment are omitted by referring to the descriptions in the first non-limiting embodiment.

Figure 17:
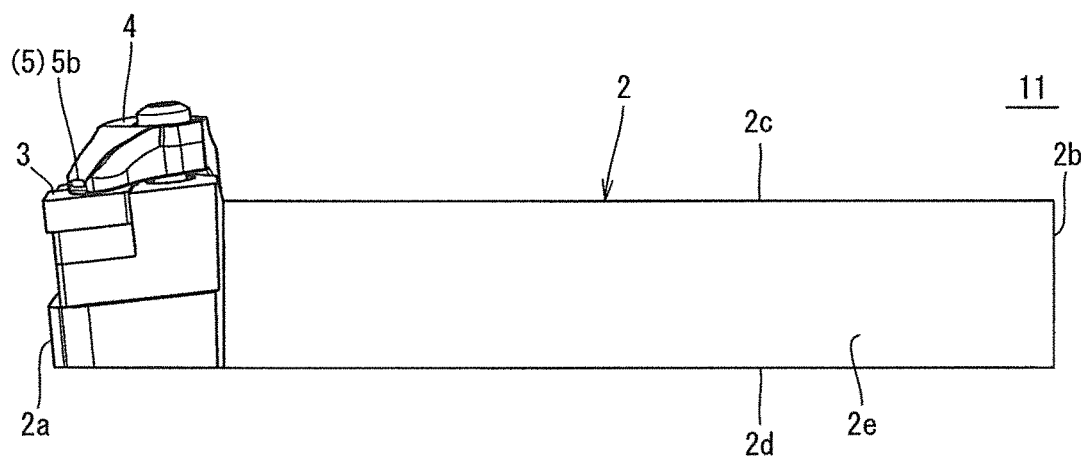
FIG. 17 is a side view illustrating a cutting tool in a second non-limiting embodiment of the present disclosure.
Figure 18:
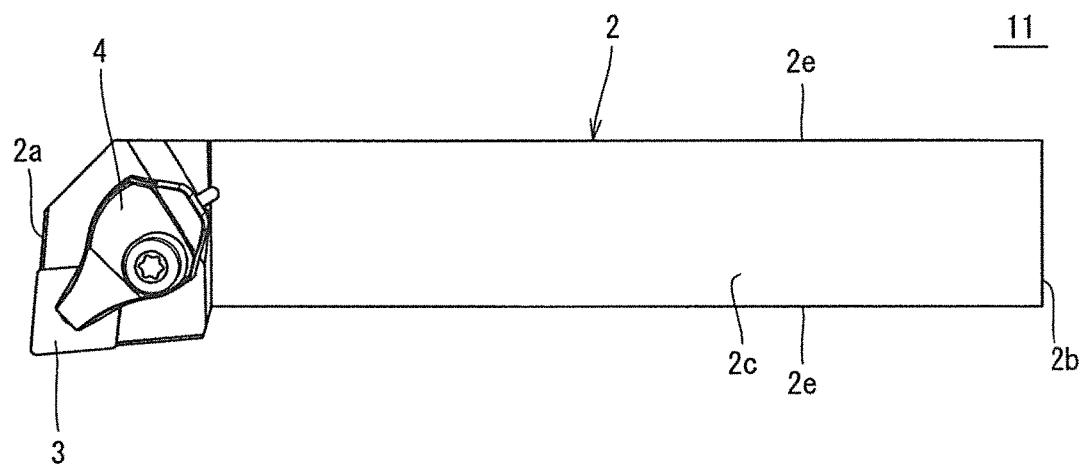
FIG. 18 is a top view illustrating the cutting tool in FIG. 17.
Figure 19:
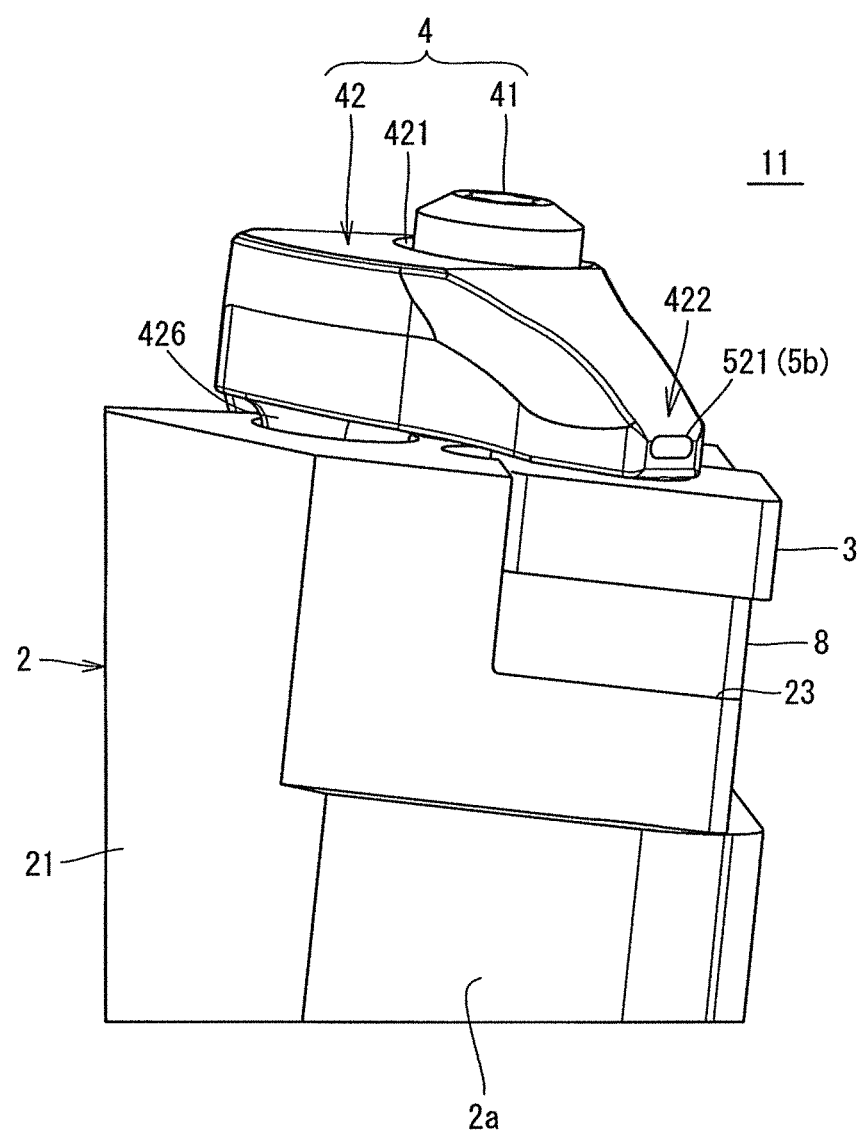
FIG. 19 is an enlarged diagram illustrating a state in which the cutting tool in FIG. 17 is viewed from a side of a first end.
Figure 20:
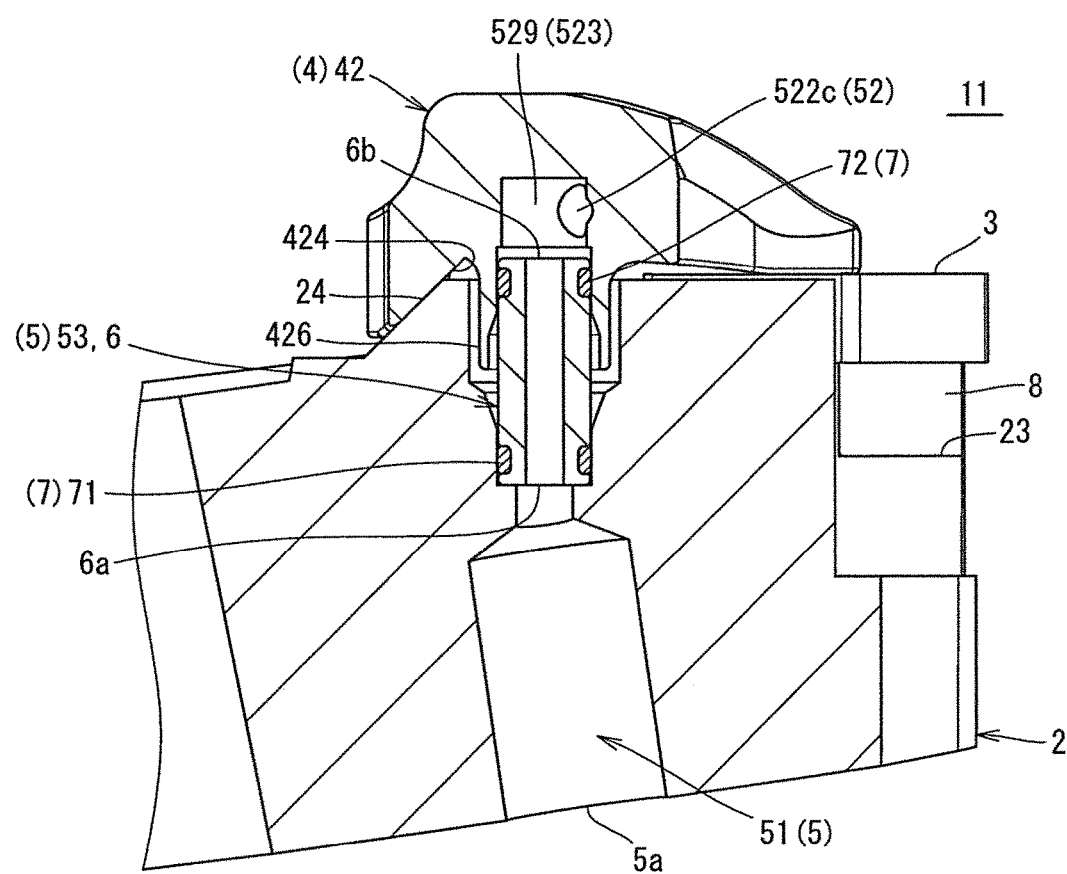
FIG. 20 is a diagram illustrating the cutting tool in FIG. 17 and corresponding to FIG. 6 in the first non-limiting embodiment.
Figure 21:
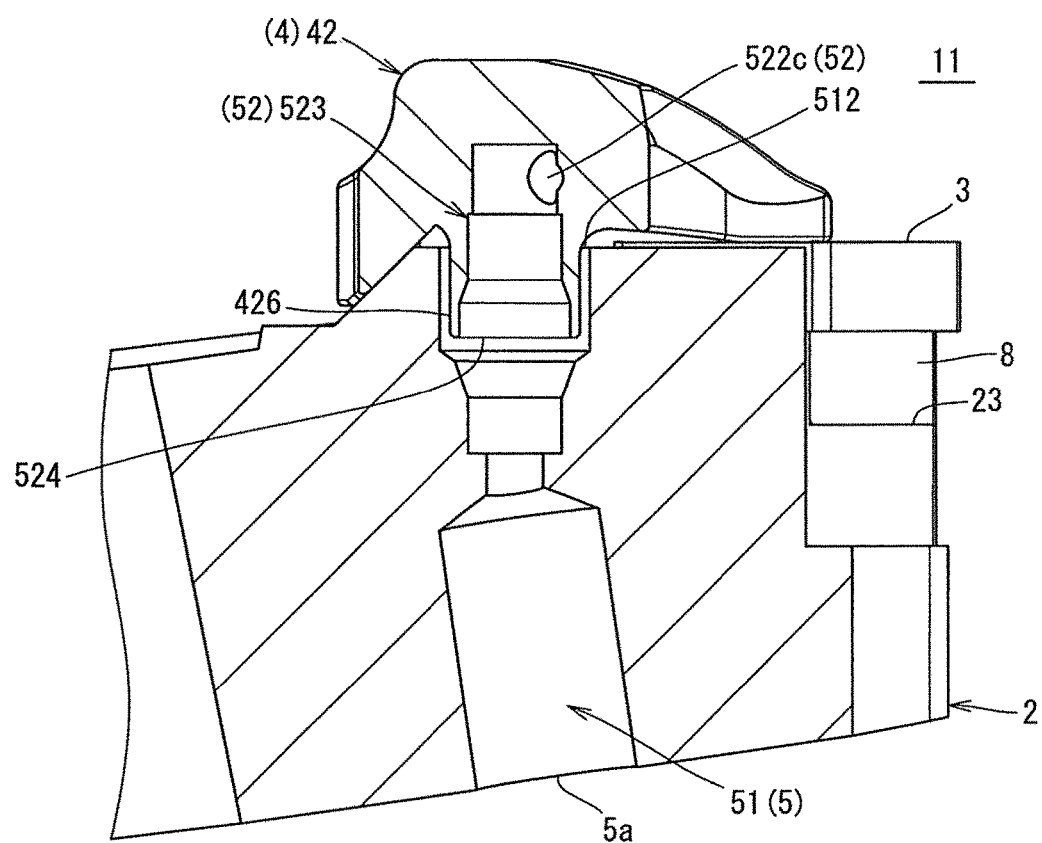
FIG. 21 is a diagram of FIG. 20 without the pipe.
Figure 25:
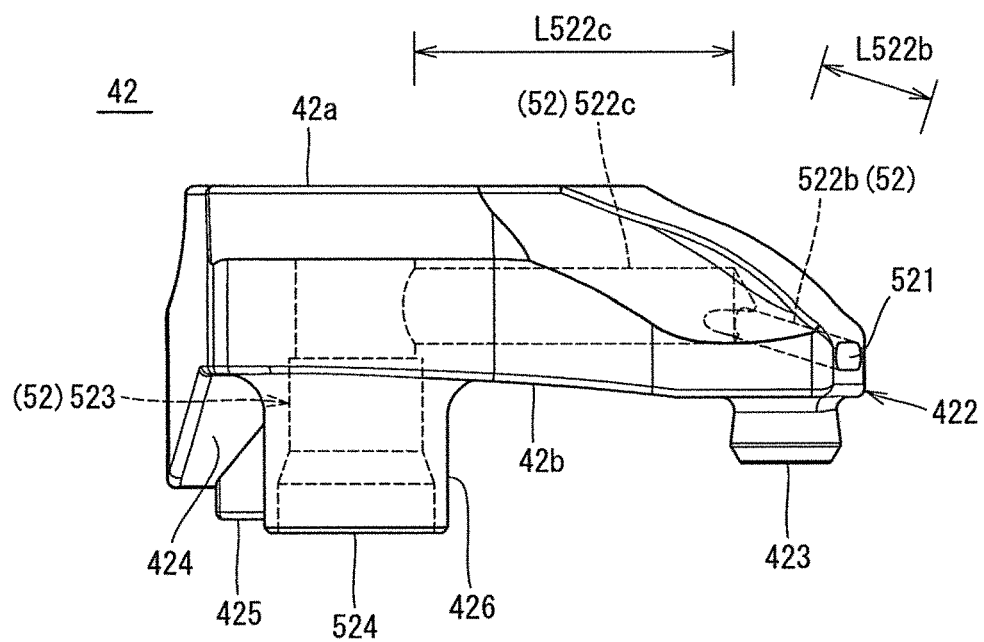
FIG. 25 is a side view illustrating the clamp in FIG. 24.
Figure 26:
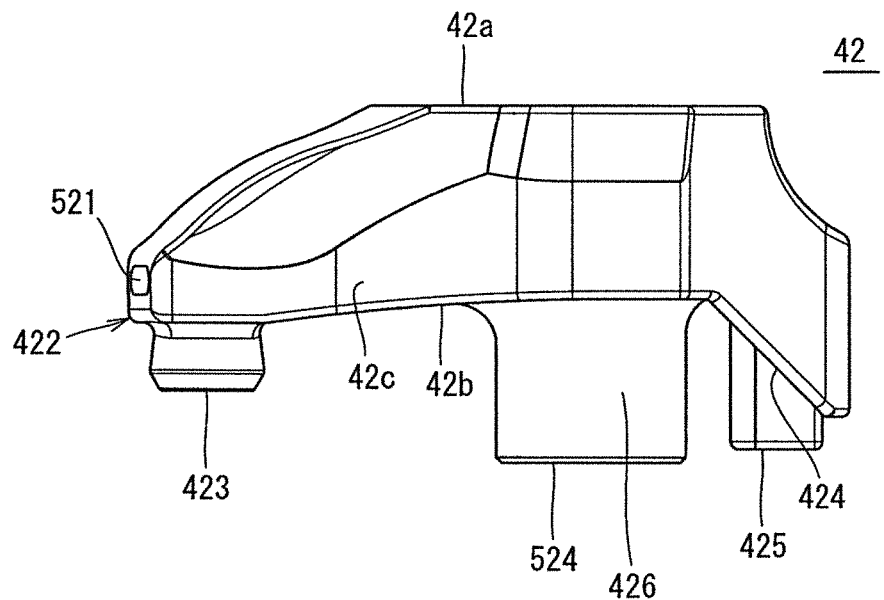
FIG. 26 is a side view illustrating the clamp in FIG. 25 when viewed from a direction different from that in FIG. 25.

In the cutting tool 11 in the second non-limiting embodiment illustrated in FIGS. 17 to 19, a clamp 42 and a second flow path 52 may have the following configurations. That is, the clamp 42 may further include a protrusion 426 protruding downward as illustrated in FIGS. 25 and 26. The second flow path 52 may include a second coupling part 523 including a second coupling port 524 that a second end part 6b of a pipe 6 may be inserted as illustrated in FIGS. 20 and 21. The second coupling part 523 may be located in the protrusion 426. When satisfying these configurations, the pipe 6 is less likely to unintentionally come out of the second coupling part 523 when a screw 41 is loosen to replace an insert 3. This leads to enhanced operability when replacing the insert 3.

Figure 22:
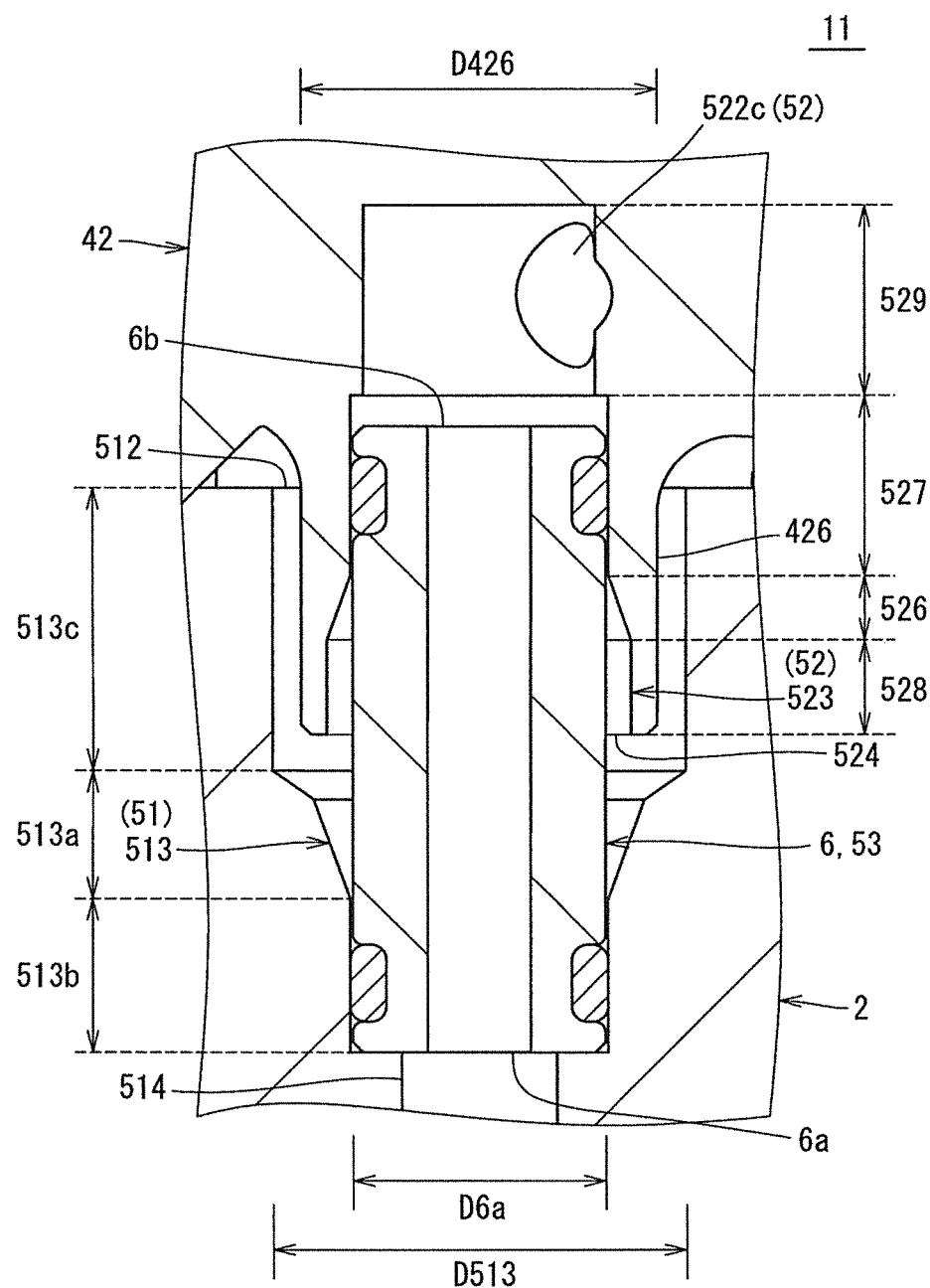
FIG. 22 is an enlarged diagram illustrating circumferences of the pipe in FIG. 20.
Figure 23:
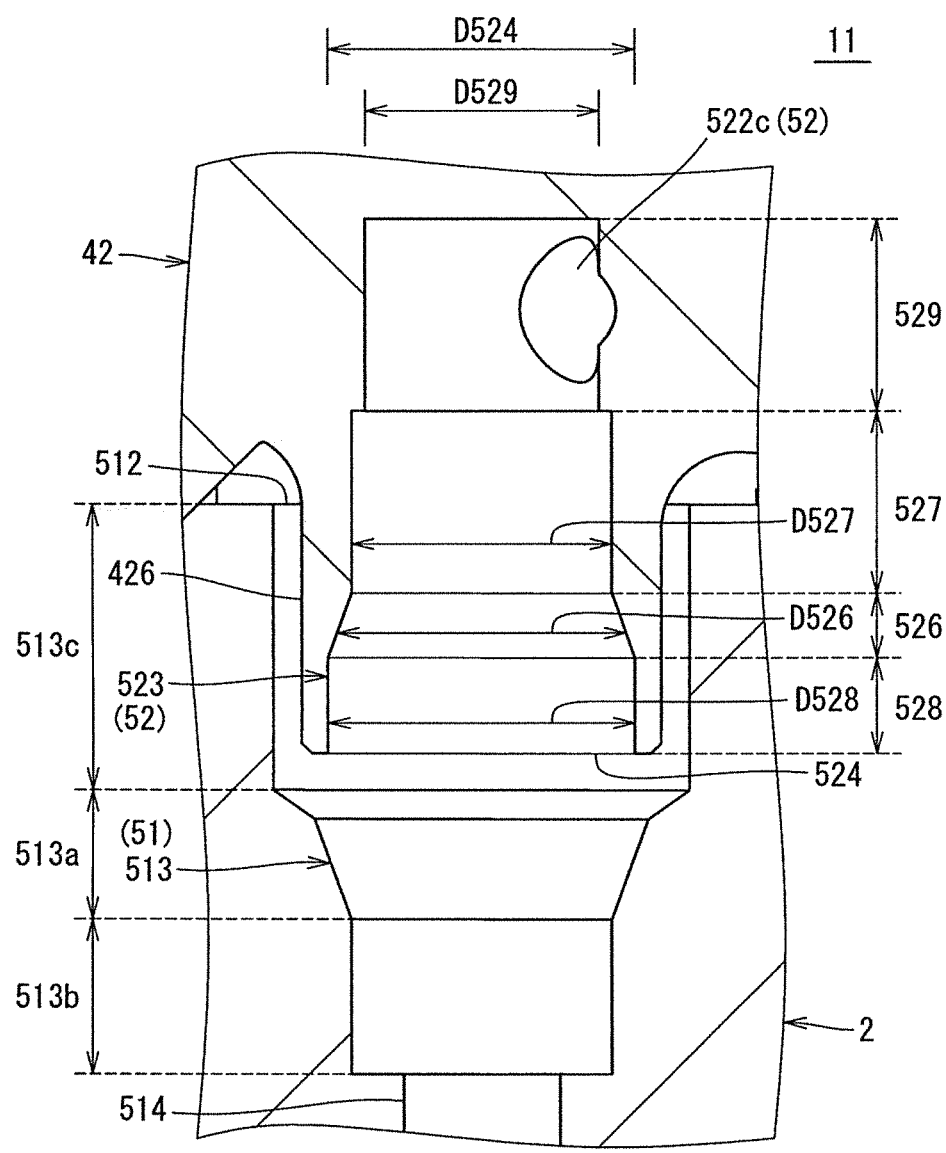
FIG. 23 is a diagram of FIG. 22 without the pipe.

At least a part of the second coupling part 523 may be located in the protrusion 426. For example, a part of the second coupling part 523 which is located from the second coupling port 524 to a fourth region 527 described later is located in the protrusion 426 in the second non-limiting embodiment as illustrated in FIGS. 22 and 23. The fourth region 527 may be substantially located in the protrusion 426. That is, most part of the fourth region 527 may be located in the protrusion 426, and a slight remaining part thereof may not be located in the protrusion 426.

The protrusion 426 protrudes downward from a lower surface 42b in the second non-limiting embodiment as illustrated in FIGS. 25 and 26. More specifically, the protrusion 426 protrudes along a direction orthogonal to the lower surface 42b. The second coupling port 524 opens into a lower end surface of the protrusion 426.

The second coupling part 523 may include a third region 526 and a fourth region 527 as illustrated in FIGS. 22 and 23. The third region 526 is a region extending from a side of the second coupling port 524 toward inward of the clamp 42. The fourth region 527 is a cylindrical region located farther from the second coupling port 524 than the third region 526.

An inner diameter D526 of the third region 526 may decrease as going farther from the second coupling port 524. An inner diameter D527 of the fourth region 527 may be smaller than the inner diameter D524 of the second coupling port 524. When satisfying these configurations, it becomes easier for the pipe 6 to be fitted to the second coupling part 523 because the third region 526 has a tapered shape. The fourth region 527 is consequently suitably fitted to the second end part 6b of the pipe 6, and the coolant is therefore less likely to leak. Additionally, because an inner diameter 526 at a side of the second coupling port 524 in the third region 526 becomes larger, it becomes easier for the pipe 6 to move in a state in which the second end part 6b of the pipe 6 is located in the second flow path 52. Consequently, it becomes easier for the pipe 6 to follow movement of the clamp 42 when the insert 3 is pulled in an arrowed direction B by the clamp 42. Alternatively, the fourth region 527 may be located continuously with the third region 526.

The fourth region 527 has an approximately cylindrical shape in the second non-limiting embodiment. In other words, a cross-sectional shape of the fourth region 527 has an approximately circular shape. With this configuration, the fourth region 527 is more suitably fitted to the second end part 6b of the pipe 6. This further enhances the effect of reducing the probability of leak of the coolant. The cross-sectional shape of the fourth region 527 may be brought closer to perfect circle in order to enhance the above effect. The inner diameter D526 may be, for example, 4-8 mm. The inner diameter D527 may be, for example, 3-7 mm.

The second coupling part 523 may further include a fifth region 528 having a cylindrical shape and located closer to the second coupling port 524 than the third region 526. An inner diameter D528 of the fifth region may be equal to the inner diameter D524 of the second coupling port 524 and may be greater than an outer diameter D6a of the pipe 6. When satisfying these configurations, a length of the second coupling part 523 that the pipe 6 may be inserted can be made longer, the pipe 6 is therefore much less likely to unintentionally come out of the second coupling part 523 when replacing the insert 3. This further enhances operability when replacing the insert 3. The fifth region 528 may be located continuously with the third region 526.

The fifth region 528 has an approximately cylindrical shape in the second non-limiting embodiment. In other words, a cross-sectional shape of the fifth region 528 has an approximately circular shape. The phrase that "the inner diameter D528 is equal to the inner diameter D524" denotes that both may be substantially equal to each other and may include a difference of, for example, ±0.5 mm. The outer diameter D6a may be, for example, 3-7 mm, the inner diameter D524 may be, for example, 5-10 mm, and the inner diameter D528 may be, for example, 5-9 mm in the second non-limiting embodiment.

The second coupling part 523 may further include a sixth region 529 having a cylindrical shape and located farther from the second coupling port 524 than the fourth region 527. An inner diameter D529 of the sixth region 529 may be smaller than the outer diameter D6a of the pipe 6. When satisfying these configurations, the pipe 6 is less likely to move more inward of the clamp 42 than the sixth region 529, and the pipe 6 is therefore less likely to come out of the clamp 42. The sixth region 529 may be located continuously with the fourth region 527. The sixth region 529 has an approximately cylindrical shape in the second non-limiting embodiment. The inner diameter D529 may be, for example, 2-5 mm.

In the cutting tool 11 in the second non-limiting embodiment, the first flow path 51 may have the following configuration as illustrated in FIGS. 22 and 23. That is, the first region 513 in the first flow path 51 may further include a second portion 513c having a cylindrical shape and located closer to the first coupling port 512 than the first portion 513a. The first coupling port 512 may be located at the second portion 513c. An inner diameter of the second portion 513c, namely, an inner diameter D513 of the first region 513 at the second portion 513c may be greater than the outer diameter D6a of the pipe 6. When satisfying these configurations, movement of the clamp 42 is allowable when the insert 3 is pulled in the arrowed direction B by the clamp 42, while retaining connection of the second flow path 52 and the third flow path 53. An inner diameter of the second portion 513c, namely, an inner diameter D513 of the first region 513 at the second portion 513c may be greater than an outer diameter D426 of the protrusion 426 in the second non-limiting embodiment. When satisfying this configuration, the movement of the camp 42 is suitably allowable when the insert 3 is pulled in the arrowed direction B by the clamp 42. Alternatively, the second portion 513c may be located continuously with the first portion 513a.

The first portion 513a has a two-step tapered shape in the second non-limiting embodiment. When satisfying this configuration, it becomes easier for the pipe 6 to move in a state in which the first end part 6a of the pipe 6 is located in the first flow path 51, and the protrusion 426 of the clamp 42 is less likely to interfere with the holder 2 by a taper located at a side of the first opening 512. Consequently, it becomes much easier for the pipe 6 to follow the movement of the clamp 42 when the insert 3 is pulled in the arrowed direction B by the clamp 42.

The second portion 513c has an approximately cylindrical shape in the second non-limiting embodiment. An inner diameter of the second portion 513c may be greater than the outer diameter D426 of the protrusion 426. The outer diameter D426 may be, for example, 6-10 mm.

Figure 24:
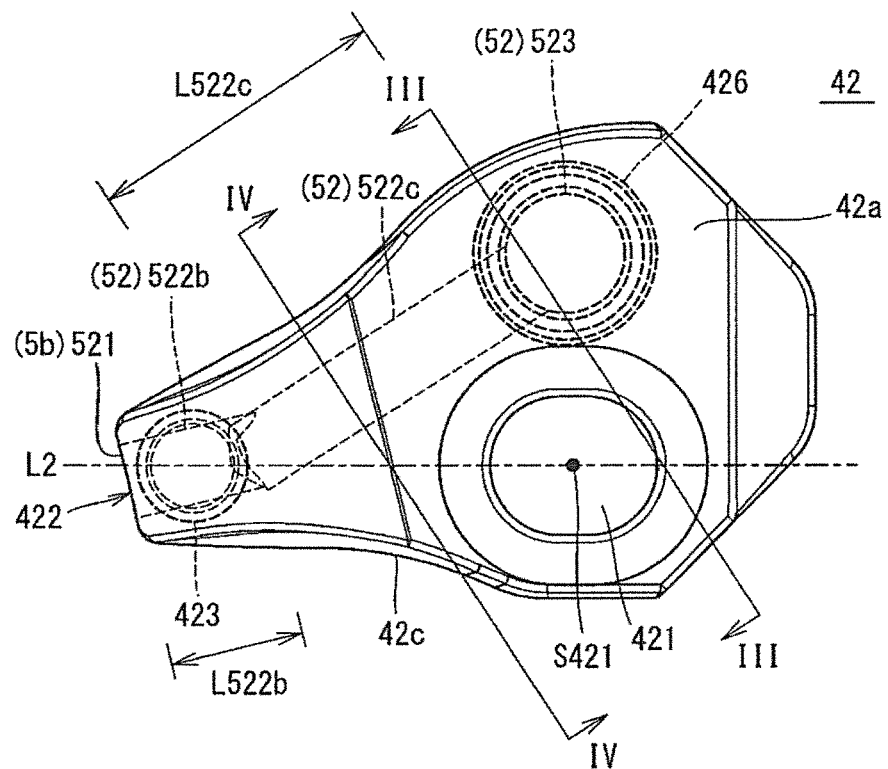
FIG. 24 is an enlarged top view illustrating a clamp in the cutting tool in FIG. 17.

The second flow path 52 may include a third portion 522b with a first opening 521 and a fourth portion 522c located farther from the first opening 521 than the third portion 522b as illustrated in FIGS. 24 and 25. A cross-sectional area of the fourth portion 522c may be greater than a cross-sectional area of the third portion 522b (refer to FIGS. 28 to 30). When satisfying these configurations, the cross-sectional area of the fourth portion 522c located upstream of the third portion 522b (located at a side of the third flow path 53) is relatively large, and a pressure loss is therefore less likely to occur. Additionally, because a cross-sectional area of the third portion 522b located at a side of the first opening 521 is relatively small, it is possible to enhance pressure at which the coolant is injected from the clamp 42. This makes it possible to enhance the cooling effect by the coolant.

The cross-sectional area of the fourth portion 522c may be, for example, 5.0-6.5 mm². The cross-sectional area of the third portion 522b may be, for example, 1.5-3.0 mm². The cross-sectional area of the fourth portion 522c may be an area of the fourth portion 522c in a cross section vertical to an extending direction of the fourth portion 522c. This is also true for the cross-sectional area of the third portion 522b. The third portion 522b corresponds to the portion 522a (the firth portion and the sixth portion) in the first non-limiting embodiment. The fourth portion 522c may be located continuously with the third portion 522b.

Figure 28:
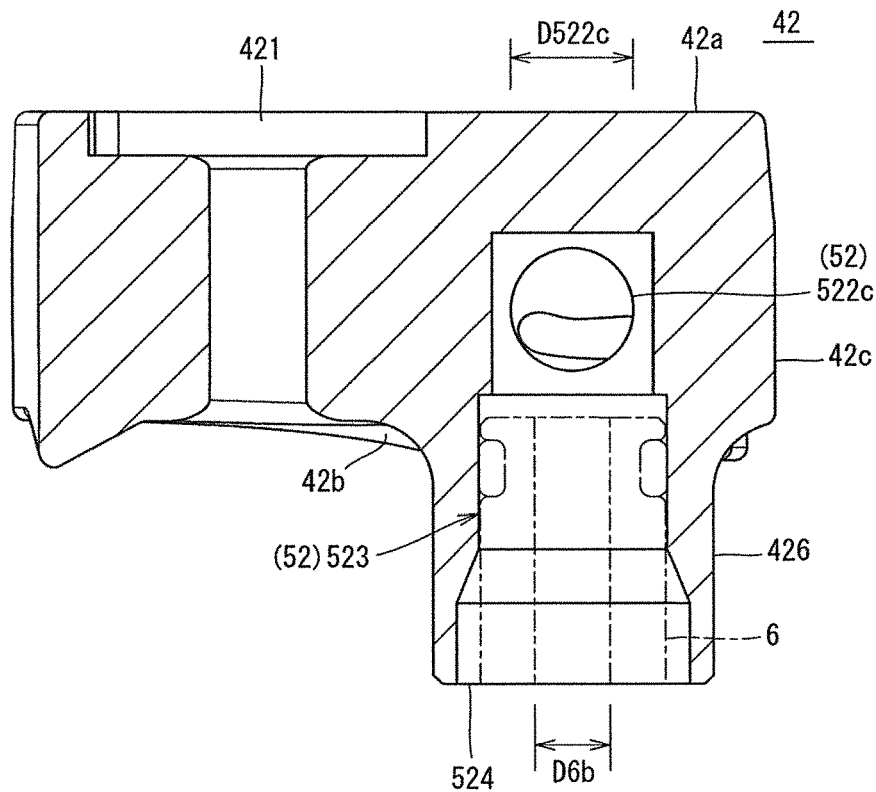
FIG. 28 is an enlarged sectional view taken along line III-III in FIG. 24.
Figure 29:
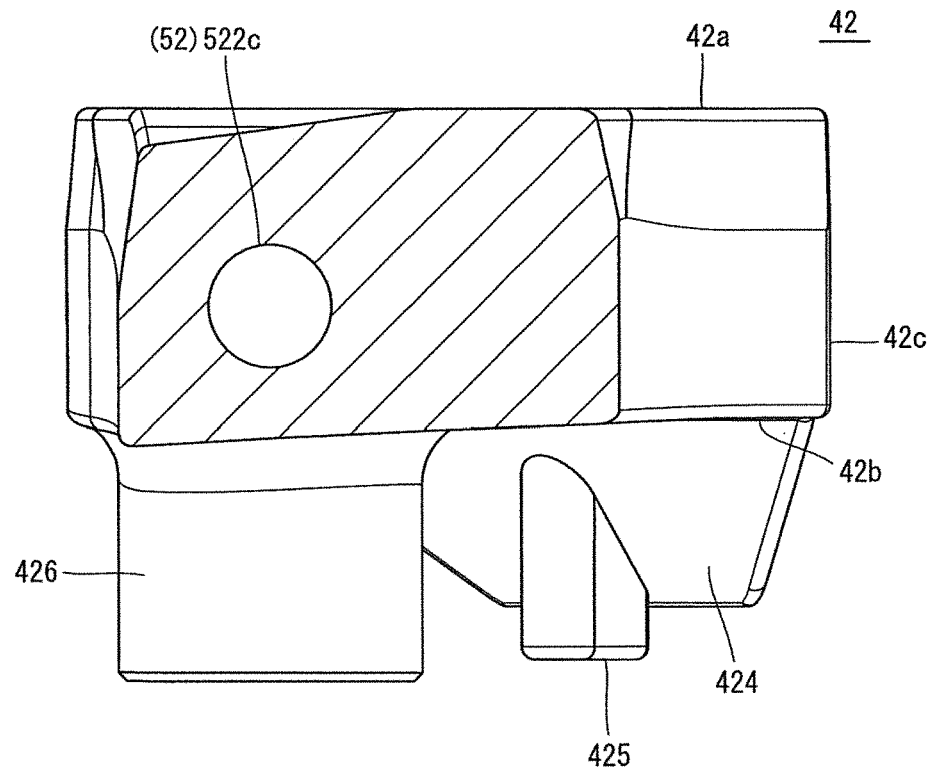
FIG. 29 is an enlarged sectional view taken along line IV-IV in FIG. 24.
Figure 30:
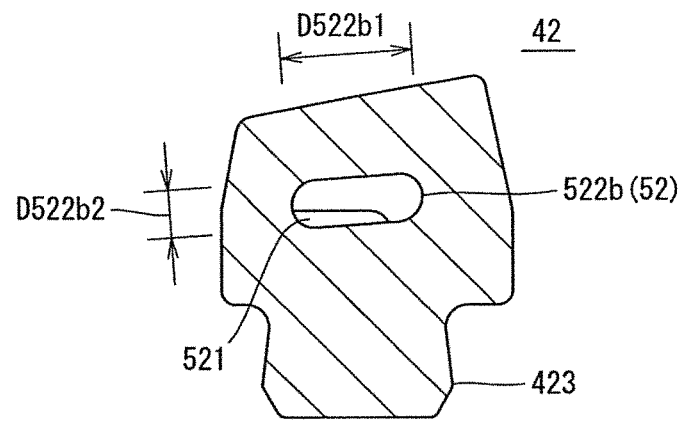
FIG. 30 is an enlarged sectional view taken along line V-V in FIG. 27.

A cross-sectional shape of the third portion 522b may be an approximately elliptical shape, in which an inner diameter D522b1 in a direction orthogonal to the central axis S421 of the through hole 421 is greater than an inner diameter D522b2 in a direction parallel to the central axis S421 as illustrated in FIG. 30. The cross-sectional shape of the fourth portion 522c may be approximately circular shape as illustrated in FIGS. 28 and 29. When satisfying these configurations, it is possible to suitably enhance the effect of reducing pressure loss and the effect of enhancing pressure when coolant is injected. This makes it possible to further enhance the cooling effect by the coolant.

The approximately circular shape is a concept including not only a strict circular shape but also those having slight irregularities or curves. The inner diameter D522b1 may be, for example, 1.5-4.0 mm. The inner diameter D522b2 may be, for example, 0.5-2.0 mm.

An inner diameter D522c of the fourth portion 522c may be equal to or more than the inner diameter D6b of the pipe 6 in the second non-limiting embodiment as illustrated in FIG. 28. When satisfying these configurations, pressure loss of the coolant can be reduced.

A length L522c of the fourth portion 522c may be greater than a length L522b of the third portion 522b as illustrated in FIGS. 24 and 25. When satisfying this configuration, flowability of the coolant is less likely to deteriorate, and the pressure loss of the coolant is less likely to occur. The length L522c of the fourth portion 522c may be, for example, 8-15 mm. The length L522b of the third portion 522b may be, for example, 3-8 mm.

The fourth portion 522c may be located continuously with the second coupling part 523. When the clamp 42 is seen through from a direction vertical to the central axis S421 of the through hole 421, the fourth portion 522c may be orthogonal to the second coupling part 523 as illustrated in FIG. 25. When satisfying these configurations, the pressure loss is less likely to occur when the coolant flows from the second coupling part 523 to the fourth portion 522c. As described above, the protrusion 426 extend orthogonally to a lower surface 42 in the second non-limiting embodiment. The second coupling part 523 located at the protrusion 426 also extends orthogonally to the lower surface 42. It can therefore be said that the fourth portion 522c is parallel to the lower surface 42b. The third portion 522b corresponds to the portion 522a (the fifth portion and the sixth portion) in the first non-limiting embodiment. The third portion 522b is inclined upward as going farther from the front end 422.

When the clamp 42 is seen through along the central axis S421 of the through hole 421, the third portion 522b and the fourth portion 522c are inclined so as to go farther from a straight line L2 as going farther from the front end 422 in the second non-limiting embodiment as illustrated in FIG. 24. The third portion 522b and the fourth portion 522c are different in inclination angle with respect to the straight line L2. Unlike the first non-limiting embodiment, the third portion 522b and the fourth portion 522c extend in a straight line shape in the second non-limiting embodiment.

Figure 27:
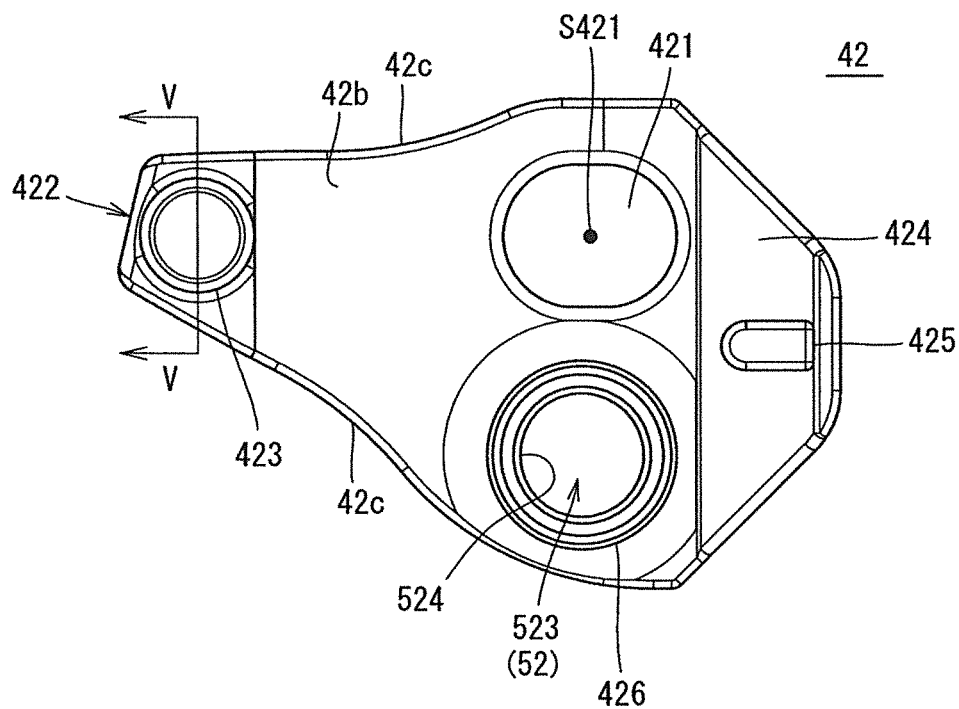
FIG. 27 is a bottom view illustrating the clamp in FIG. 24.

A pin 425 in the clamp 42 has an approximately elliptic cylinder shape in the second non-limiting embodiment as illustrated in FIGS. 26 and 27. This configuration enhances the effect of reducing the movement of the clamp 42 when tightening the screw 41. The term "approximately elliptic cylinder shape" is a concept including not only a strict elliptic cylinder shape but also those having slight irregularities or curves.

<Method of Manufacturing Machined Product>

A method of manufacturing a machined product in a non-limiting aspect of the present disclosure is described in detail below with reference to FIGS. 31 to 33.

Figure 31:
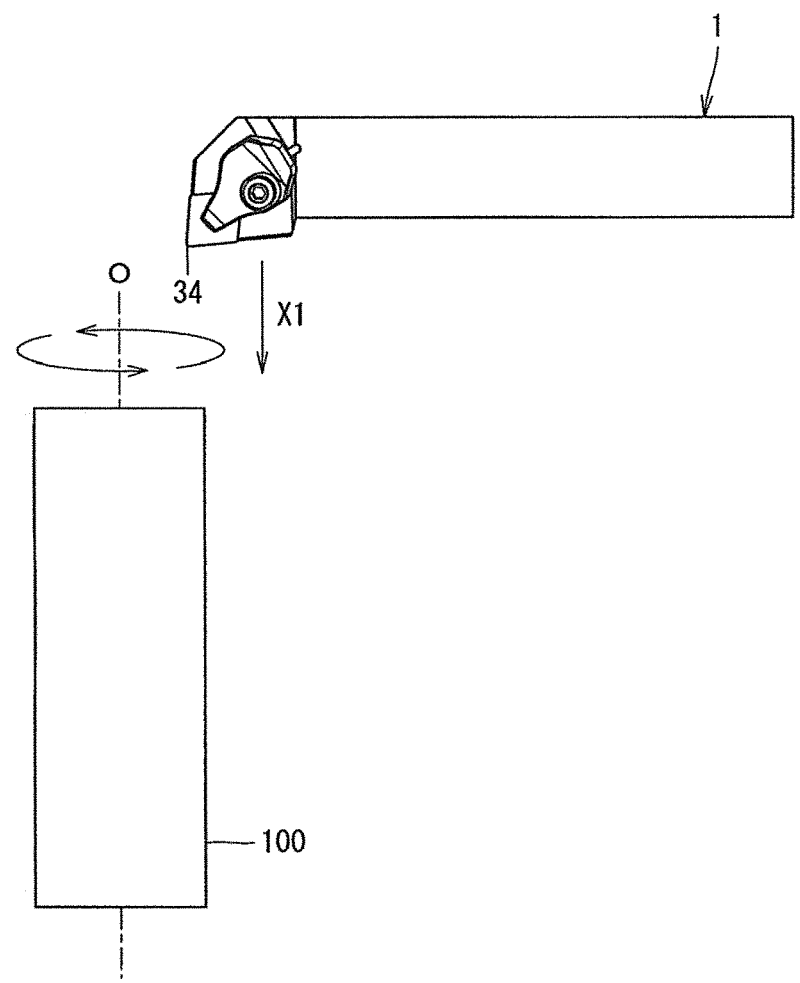
FIG. 31 is a schematic diagram illustrating a step in a method of manufacturing a machined product in a non-limiting aspect of the present disclosure.

The method of manufacturing a machined product in a non-limiting aspect of the present disclosure includes the following steps of:

(1) rotating a workpiece 100 as illustrated in FIG. 31;
(2) bringing the cutting tool 1 into contact with the workpiece 100 being rotated as illustrated in FIG. 32; and
(3) moving the cutting tool 1 away from the workpiece 100 as illustrated in FIG. 33.

Specifically, the workpiece 100 is firstly rotated around its rotation axis O as illustrated in FIG. 31. Examples of material of the workpiece 100 include carbon steel, alloy steel, stainless steel, cast iron and nonferrous metals.

The cutting tool 1 is then relatively brought near the workpiece 100 being rotated by moving the cutting tool 1 in an arrowed direction X1.

Figure 32:
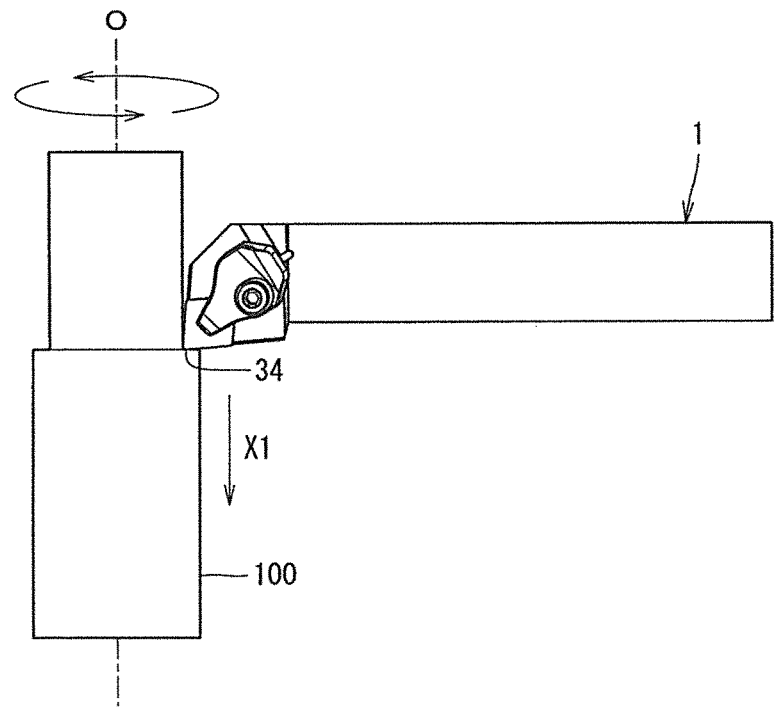
FIG. 32 is a schematic diagram illustrating a step in the method of manufacturing a machined product in a non-limiting aspect of the present disclosure.

Subsequently, the workpiece 100 is cut out by bringing the cutting edge 34 in the cutting tool 1 into contact with the workpiece 100 being rotated as illustrated in FIG. 32. Alternatively, the workpiece 100 may be cut out while causing the coolant to flow out of the first opening 521.

Figure 33:
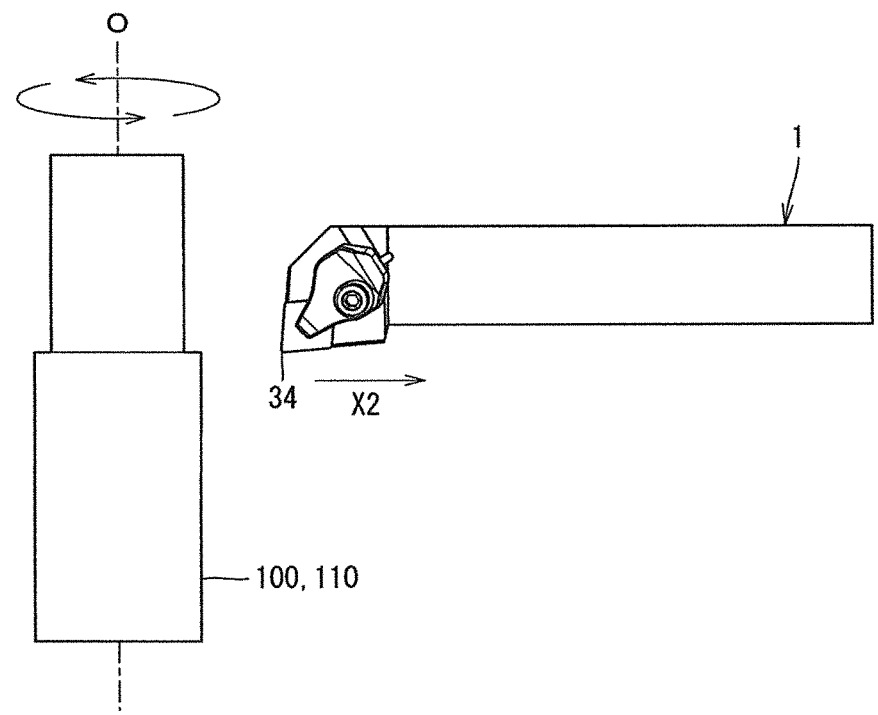
FIG. 33 is a schematic diagram illustrating a step in the method of manufacturing a machined product in a non-limiting aspect of the present disclosure.

Finally, the cutting tool 1 is relatively moved away from the workpiece 100 to obtain the workpiece 110 by moving the cutting tool 1 in an arrowed direction X2 as illustrated in FIG. 33.

With the method of manufacturing a machined product in a non-limiting aspect of the present disclosure, a cutting process can be carried out in a state in which the coolant is suitably sprayed to the insert 3 while firmly securing the insert 3 to the holder 2. This leads to a long tool life of the cutting tool 1 and enhanced machined surface accuracy of the machined product 110.

Although the machined product 110 is obtainable by moving the cutting tool 1 in a non-limiting aspect of the present disclosure, there is no intention to limit thereto. For example, the workpiece 100 may be brought near the cutting tool 1 in the step (1). Similarly, the workpiece 100 may be moved away from the cutting tool 1 in the step (3). When the cutting process is continued, it is necessary to repeat the step of bringing the cutting edge 34 into contact with different portions of the workpiece 100, while the workpiece 100 is kept rotating. Although the present non-limiting aspect of the disclosure has been described by illustrating the case of using the cutting tool 1 in the first non-limiting embodiment, the cutting tool 11 in the second non-limiting embodiment may be used instead of the cutting tool 1.

While the non-limiting embodiments and non-limiting aspects in the present disclosure have been illustrated and described above, the present disclosure is not limited to the foregoing. It is, of course, possible to make any arbitrary ones in so far as they do not depart from the gist of the present disclosure.

Singular forms "a", "an" and "the" in the entirety of the present disclosure include plural forms thereof unless clearly indicated not being so from the context.

DESCRIPTION OF THE REFERENCE NUMERALS 1 cutting tool
2 holder
  2a first end
  2b second end
  2c upper surface
  2d lower surface
  2e side surface
  21 head
  211 lower surface
  22 shank
  23 pocket
  24 first surface
    241 upper edge
  25 screw hole
  26 groove
3 cutting insert
  31 upper surface
  32 lower surface
  33 side surface
  34 cutting edge
  35 ridge part
  36 hole
4 clamp member
  41 screw
  42 clamp
    42a upper surface
    42b lower surface
    42c side surface
    421 through hole
    422 front end
      423 engaging part
    424 second surface
    425 pin
    426 protrusion
5 flow path
  5a inflow port
  5b outflow port
  51 first flow path
    511 first coupling part
      512 first coupling port
      513 first region
        513a first portion
        513b portion
        513c second portion
      514 second region
    515 first part
  52 second flow path
    521 first opening
    522a portion (fifth and sixth portions)
    522b third portion
    522c fourth portion
    523 second coupling part
    524 second coupling port
    525 step part
    526 third region
    527 fourth region
    528 fifth region
    529 sixth region
  53 third flow path
6 pipe
  6a first end part
  6b second end part
7 sealing member
  71 first sealing member
  72 second sealing member
8 sheet member
11 cutting tool
100 workpiece
110 machined product

What is claimed is:

1. A cutting tool, comprising:
a holder having a shape extending from a first end to a second end and comprising a pocket located at a side of the first end;
a cutting insert located at the pocket;

a clamp member configured to fix the cutting insert to the pocket; and
a flow path comprising an inflow port and an outflow port, wherein
the holder further comprises a screw hole and a first surface located closer to a side of the second end than the screw hole and inclined downward as going farther from the cutting insert,
the clamp member comprises a screw configured to engage with the screw hole and a clamp,
the clamp comprises a through hole where the screw is inserted, a front end configured to engage with the cutting insert, and a second surface configured to come into contact with the first surface,
the flow path further comprises a first flow path located in the holder, a second flow path located in the clamp, and a third flow path that is a pipe connecting the first flow path and the second flow path,
the pipe comprises a first end part located in the first flow path and a second end part located in the second flow path,
the first flow path comprises a first coupling part comprising a first coupling port where the first end part is inserted,
the first flow part further comprises a first step part,
the second flow path comprises a second coupling part comprising a second coupling port where the second end part is inserted,
the second coupling part further comprises a second step part, and
inner diameters of the first step part and the second step part are smaller than an outer diameter of the pipe.

2. The cutting tool according to claim 1, further comprising:
a first annular sealing member configured to be fitted to an outer peripheral part of the first end part; and
a second annular sealing member configured to be fitted to an outer peripheral part of the second end part.

3. The cutting tool according to claim 1, wherein
the clamp further comprises a protrusion protruding downward, and
the second coupling part is located in the protrusion.

4. The cutting tool according to claim 3, wherein
the second coupling part further comprises a third region extending from a side of the second coupling port into the clamp, and a fourth region having a cylindrical shape and located farther from the second coupling port than the third region,
an inner diameter of the third region becomes smaller as going farther from the second coupling port, and
an inner diameter of the fourth region is smaller than an inner diameter of the second coupling port.

5. The cutting tool according to claim 4, wherein
the second coupling part further comprises a fifth region having a cylindrical shape and located closer to the second coupling port than the third region, and
an inner diameter of the fifth region is equal to the inner diameter of the second coupling port and greater than an outer diameter of the pipe.

6. The cutting tool according to claim 4, wherein
the second coupling part further comprises a sixth region having a cylindrical shape and located farther from the second coupling port than the fourth region, and
an inner diameter of the sixth region is smaller than an outer diameter of the pipe.

7. The cutting tool according to claim 1, wherein
the second coupling part has a cylindrical shape, and the second step part is located along a semiperiphery of the second coupling part.

8. The cutting tool according to claim 1, wherein
the first coupling part comprises a first region extending from the first coupling port into the holder, and
the first region comprises a first portion whose inner diameter becomes smaller as going farther from the first coupling port.

9. The cutting tool according to claim 8, wherein
the first region further comprises a second portion having a cylindrical shape and located closer to the first coupling port than the first portion,
the first coupling port is located at the second portion, and
an inner diameter of the second portion is greater than an outer diameter of the pipe.

10. The cutting tool according to claim 8, wherein
the first coupling part further comprises a second region having a cylindrical shape and located farther from the first coupling port than the first region, and
an inner diameter of the second region is smaller than an outer diameter of the pipe.

11. The cutting tool according to claim 1, wherein
a straight line connecting a center of the screw and the front end is orthogonal to an upper edge of the first surface.

12. The cutting tool according to claim 1, wherein
the second flow path comprises a first opening that opens into the front end as the outflow port.

13. The cutting tool according to claim 12, wherein
an inner diameter of the first opening in a direction orthogonal to a central axis of the through hole is greater than an inner diameter of the first opening in a direction parallel to the central axis.

14. The cutting tool according to claim 12, wherein
the second flow path comprises a third portion comprising the first opening and a fourth portion located farther from the first opening than the third portion, and
a cross-sectional area of the fourth portion is greater than a cross-sectional area of the third portion.

15. The cutting tool according to claim 14, wherein
a cross-sectional shape of the third portion is an approximately elliptical shape in which an inner diameter in a direction orthogonal to a central axis of the through hole is greater than an inner diameter in a direction parallel to the central axis, and
a cross-sectional shape of the fourth portion is an approximately circular shape.

16. The cutting tool according to claim 14, wherein
a length of the fourth portion is greater than a length of the third portion.

17. The cutting tool according to claim 1, wherein
the second flow path comprises a fifth portion, as going farther away from the front end, that is inclined and leading away from a straight line that connects a central axis of the through hole and the front end.

18. The cutting tool according to claim 1, wherein
the second flow path comprises a sixth portion inclined upward as going farther from the front end.

19. A method of manufacturing a machined product, comprising:
rotating a workpiece;
bringing the cutting tool according to claim 1 into contact with the workpiece being rotated; and
moving the cutting tool away from the workpiece.

20. A cutting tool, comprising:
- a holder having a shape extending from a first end to a second end and comprising a pocket located at a side of the first end;
- a cutting insert located at the pocket;
- a clamp member configured to fix the cutting insert to the pocket; and
- a flow path comprising an inflow port and an outflow port, wherein
  - the holder further comprises a screw hole and a first surface located closer to a side of the second end than the screw hole and inclined downward as going farther from the cutting insert,
  - the clamp member comprises a screw configured to engage with the screw hole and a clamp,
  - the clamp comprises a through hole where the screw is inserted, a front end configured to engage with the cutting insert, and a second surface configured to come into contact with the first surface,
  - the flow path further comprises a first flow path located in the holder, a second flow path located in the clamp, and a third flow path that is a pipe connecting the first flow path and the second flow path,
  - the pipe comprises a first end part located in the first flow path and a second end part located in the second flow path,
  - the first end part is pivotable in the first flow path,
  - the second end part is pivotable in the second flow path, and
  - the pipe is configured to move with the clamp and pivot toward the first surface.

* * * * *